(12) United States Patent
Liu et al.

(10) Patent No.: US 11,445,526 B2
(45) Date of Patent: Sep. 13, 2022

(54) METHOD AND DEVICE IN NODES USED FOR WIRELESS COMMUNICATION

(71) Applicants: Zheng Liu, Shanghai (CN); Xiaobo Zhang, Shanghai (CN)

(72) Inventors: Zheng Liu, Shanghai (CN); Xiaobo Zhang, Shanghai (CN)

(73) Assignee: SHANGHAI LANGBO COMMUNICATION TECHNOLOGY COMPANY LIMITED, Shanghai (CN)

( * ) Notice: Subject to any disclaimer, the term of this patent is extended or adjusted under 35 U.S.C. 154(b) by 0 days.

(21) Appl. No.: 17/219,921

(22) Filed: Apr. 1, 2021

(65) Prior Publication Data

US 2021/0314973 A1 Oct. 7, 2021

(30) Foreign Application Priority Data

Apr. 3, 2020 (CN) .......................... 202010257862.8

(51) Int. Cl.
*H04W 72/12* (2009.01)
*H04W 74/08* (2009.01)
*H04L 27/26* (2006.01)
*H04B 1/38* (2015.01)

(52) U.S. Cl.
CPC ... *H04W 72/1252* (2013.01); *H04L 27/26025* (2021.01); *H04W 72/1263* (2013.01); *H04W 74/0808* (2013.01); *H04B 1/38* (2013.01)

(58) Field of Classification Search
CPC ......... H04W 72/1252; H04W 72/1263; H04W 74/0808; H04W 72/0406; H04W 72/044; H04W 72/0453; H04L 27/26025; H04L 5/001; H04L 5/0053; H04L 5/0064; H04L 5/0094; H04L 27/2602; H04B 1/38
See application file for complete search history.

(56) References Cited

U.S. PATENT DOCUMENTS

| | | | |
|---|---|---|---|
| 11,233,610 B2* | 1/2022 | Xu ........................ | H04L 5/0053 |
| 2019/0349155 A1* | 11/2019 | Xu .......................... | H04L 5/001 |
| 2021/0092715 A1* | 3/2021 | Wu .................... | H04W 72/0453 |
| 2021/0144746 A1* | 5/2021 | Ji ........................... | H04W 24/06 |
| 2021/0195559 A1* | 6/2021 | Khoshnevisan .......... | H04L 1/08 |

(Continued)

FOREIGN PATENT DOCUMENTS

| | | | | |
|---|---|---|---|---|
| WO | WO-2021161266 A1 * | 8/2021 | | |
| WO | WO-2021227823 A1 * | 11/2021 | ........ | H04W 72/0453 |

*Primary Examiner* — Ahmed Elallam

(57) ABSTRACT

The present disclosure provides a method and a device in nodes used for wireless communication. A node receives a first information block, transmits a second information block and monitors M1 control channel candidates in a first time window; the first information block indicates a scheduled cell set; the M1 control channel candidates occupy M2 control channel elements; the second information block indicates a combination employed by the serving cell(s) comprised by the first scheduling cell subset; a first SCS is used to determine a time length of a multicarrier symbol in the first time window, and the combination employed by the first scheduling cell subset is used to determine a number of multicarrier symbols comprised in the first time window; M1 is no greater than a first threshold, and M2 is no greater than a second threshold. This disclosure can improve scheduling performance.

20 Claims, 9 Drawing Sheets

(56) References Cited

U.S. PATENT DOCUMENTS

2021/0212042 A1\* 7/2021 Zhang ............... H04W 74/0833
2021/0352681 A1\* 11/2021 Jiang ................. H04W 72/1231
2021/0359791 A1\* 11/2021 Wu ....................... H04L 5/0055

\* cited by examiner

| SCS Index | First-type candidate parameter | Second-type candidate parameter |
|---|---|---|
| 0 | 44 | 56 |
| 1 | 36 | 56 |
| 2 | 22 | 48 |
| 3 | 20 | 32 |

METHOD AND DEVICE IN NODES USED FOR WIRELESS COMMUNICATION

CROSS REFERENCE TO RELATED APPLICATIONS

This application claims the priority benefit of Chinese Patent Application No. 202010257862.8, filed on Apr. 3,2020, the full disclosure of which is incorporated herein by reference.

BACKGROUND

Technical Field

The present disclosure relates to transmission methods and devices in wireless communication systems, and in particular to a scheme and device of multicarrier transmission in a wireless communication system in wireless communications.

Related Art

Application scenarios of future wireless communication systems are becoming increasingly diversified, and different application scenarios have different performance demands on systems. In order to meet different performance requirements of various application scenarios, the $3^{rd}$ Generation Partner Project (3GPP) Radio Access Network (RAN) #72 plenary decided to conduct the study of New Radio (NR), or what is called fifth Generation (5G). The work Item (WI) of NR was approved at the 3GPP RAN #75 plenary to standardize the NR.

Enhanced Mobile BroadBand (eMBB), Ultra-reliable and Low Latency Communications (URLLC), and massive Machine Type Communications (mMTC) are three major scenarios of application of the NR technology. And multicarrier (including Carrier Aggregation (CA) and Dual Connectivity (DC)) is an effective technical means of fulfilling eMBB and URLLC demands.

SUMMARY

In the multicarrier communications, such as CA, Cross Carrier Scheduling is supported. And in order to meet requirements of URLLC, a UE can monitor a physical downlink control channel (PDCCH) Candidate based on Span. A combination of CA and Span-based scheduling can maximize the flexibility of network scheduling and configuration and optimize the entire system's performance.

To address the issue of multicarrier technology application in URLLC scenario, the present disclosure provides a solution. It should be noted that though the present disclosure only took the multicarrier and URLLC as a typical or exemplary scenario in the statement above, it is also applicable to other scenarios confronting the same difficulty, including other multicarrier transmissions or multi-channel transmissions, or other networks having specific demands on data scheduling, where similar technical effects can be achieved. Additionally, the adoption of a unified solution for various scenarios, including but not limited to multicarrier and URLLC scenarios, contributes to the reduction of hardcore complexity and costs. If no conflict is incurred, embodiments in the first node in the present disclosure and the characteristics of the embodiments are also applicable to a second node, and vice versa. Particularly, for interpretations of the terminology, nouns, functions and variants (unless otherwise specified) in the present disclosure, refer to definitions given in TS36 series, TS38 series and TS37 series of 3GPP specifications.

The present disclosure provides a method in a first node for wireless communications, comprising:

receiving a first information block and transmitting a second information block, the first information block being used to determine a scheduled cell set, the scheduled cell set comprising more than one serving cell, the scheduled cell set comprises a first scheduled cell subset, the first scheduled cell subset comprising a positive integer number of serving cell(s), and any serving cell comprised by the first scheduled cell subset belonging to the scheduled cell set;

monitoring M1 control channel candidates in a first time window, the M1 control channel candidates occupying M2 control channel elements, M1 being a positive integer greater than 1, and M2 being a positive integer greater than 1, and the first time window comprising a positive integer number of time-domain consecutive multicarrier symbols;

herein, a first scheduling cell subset comprises scheduling cell(s) of serving cell(s) comprised by the first scheduled cell subset, and the M1 control channel candidates are monitored in serving cell(s) comprised by the first scheduling cell subset, the first scheduling cell subset comprising a positive integer number of serving cell(s); the second information block is used to indicate a combination employed by the serving cell(s) comprised by the first scheduling cell subset, and the combination employed by the serving cell(s) comprised by the first scheduling cell subset comprises two positive integers; a subcarrier spacing (SCS) of subcarriers occupied by one of the M2 control channel elements in frequency domain is equal to a first SCS, and the first SCS is used to determine a time length of a multicarrier symbol comprised by the first time window, and the combination employed by the serving cell(s) comprised by the first scheduling cell subset is used to determine a number of multicarrier symbols comprised by the first time window; M1 is no greater than a first threshold, M2 is no greater than a second threshold, and both the first threshold and the second threshold are positive integers; a number of serving cell(s) comprised by the first scheduled cell subset and a number of serving cells comprised by the scheduled cell set are jointly used to determine the first threshold and the second threshold.

In one embodiment, by determining the first time window according to a combination employed by serving cell(s) comprised in the first scheduling cell subset, the sharing of the capability of blind detection of PDCCH Candidates and channel estimation on Non-overlapped CCEs is achieved according to a combination configuration of scheduling cells of a serving cell rather than the serving cell itself, thus offering a solution to the mismatch between the numbers of PDCCH Candidates and Non-overlapped CCEs assigned and those actually required for use caused by varied combination configurations of scheduling carriers and scheduled carriers during the application of Cross Carrier Scheduling, hence a reduction in PDCCH blocking rate and an improvement in the scheduling performance.

In one embodiment, serving cell(s) comprised by the first scheduled cell subset is(are) determined according to a combination and an SCS employed by serving cell(s) comprised by the first scheduling cell subset, and then PDCCH Candidates and non-overlapped CCEs are assigned, so as to prevent the quantity of the PDCCH Candidates and non-overlapped CCEs assigned for a scheduling cell from exceeding the scheduling cell's PDCCH monitoring capability and ensure correct PDCCH reception when supporting span-based PDCCH monitoring.

According to one aspect of the present disclosure, the above method is characterized in employing a first-type monitoring capability in a scheduling cell of any serving cell comprised by the scheduled cell set, the first information block being used to indicate the first-type monitoring capability; no more than one control resource set (CORESET) pool is provided in the scheduling cell of any serving cell comprised by the scheduled cell set.

In one embodiment, as is restricted herein, no more than one control resource set (CORESET) pool is provided in a scheduling cell of any serving cell comprised by the scheduled cell set, which in turn restricts simultaneous performances of multi-PDCCH monitoring in multi-TRP and multi-Panel transmissions and span-based PDCH monitoring, thus achieving design optimization based on application requirements, avoiding an unnecessary drastic increase of UE complexity and reducing the implementation cost, and streamlining the design.

According to one aspect of the present disclosure, the above method is characterized in that a ratio of the number of serving cell(s) comprised by the first scheduled cell subset to a number of serving cell(s) comprised by the scheduled cell set being associated with at least one control channel candidate is used to determine a first parameter; the first threshold is equal to a maximum integer no greater than a first intermediate value, and the first intermediate value is proportional to the first parameter; the second threshold is equal to a maximum integer no greater than a second intermediate value, and the second intermediate value is proportional to the first parameter.

According to one aspect of the present disclosure, the above method is characterized in that a second parameter is used to determine the first threshold and the second threshold, the second parameter being a positive integer; the second parameter is equal to the number of serving cells comprised by the scheduled cell set; or, comprising:

transmitting a third information block;

herein, the third information block is used to indicate the second parameter.

According to one aspect of the present disclosure, the above method is characterized in that the first SCS is one of X candidate SCSs, X being a positive integer greater than 1; the X candidate SCSs respectively correspond to X first-type candidate parameters, and any of the X first-type candidate parameters is a positive integer, the X candidate SCSs respectively correspond to X second-type candidate parameters, and any of the X second-type candidate parameters is a positive integer; a third parameter is one of the X first-type candidate parameters, and the third parameter is used to determine the first threshold; a fourth parameter is one of the X second-type candidate parameters, and the fourth parameter is used to determine the second threshold; the first SCS is used to determine the third parameter out of the X first-type candidate parameters, and the first SCS is used to determine the fourth parameter out of the X second-type candidate parameters.

According to one aspect of the present disclosure, the above method is characterized in comprising:

receiving a fourth information block;

herein, the fourth information block is used to determine M3 control resource sets, M3 being a positive integer greater than 1, and a control resource set to which any one of the M2 control channel elements belongs is one of the M3 control resource sets; the second information block is used to indicate a target combination set, the target combination set comprising a positive integer number of combination(s), a combination employed by the serving cell(s) comprised by the first scheduling cell subset belongs to the target combination set; the number of multicarrier symbols comprised by the first time window is equal to a larger value between a first symbol quantity and a second symbol quantity; the first symbol quantity is equal to a maximum value of numbers of multicarrier symbols respectively occupied by the M3 control resource sets in time domain, while the second symbol quantity is equal to a minimum value of positive integers comprised by the combination(s) in the target combination set.

According to one aspect of the present disclosure, the above method is characterized in comprising:

receiving a fifth information block;

herein, the fifth information block is used to determine the M1 control channel candidates; a first control channel candidate is one of the M1 control channel candidates, and a second control channel candidate is one of the M1 control channel candidates other than the first control channel candidate; control channel elements occupied by the first control channel candidate are different from control channel elements occupied by the second control channel candidate, or a scrambling used by the first control channel candidate is different from a scrambling used by the second control channel candidate, or a payload size of a downlink control information (DCI) format corresponding to the first control channel candidate is different from a payload size of a DCI format corresponding to the second control channel candidate.

According to one aspect of the present disclosure, the above method is characterized in that a first control channel element is one of the M2 control channel elements, and a second control channel element is one of the M2 control channel elements other than the first control channel element; the first control channel element and the second control channel element respectively belong to different control resource sets, or a control channel candidate occupying the first control channel element and a control channel candidate occupying the second control channel element respectively start with different symbols in time domain.

According to one aspect of the present disclosure, the above method is characterized in that the M1 control channel candidates are monitored in sub-band(s) comprised by a first sub-band set, the first sub-band set comprising a positive integer number of serving cell(s); a serving cell to which any sub-band comprised by the first sub-band set belongs in frequency domain belongs to the first scheduling cell subset; a subcarrier spacing (SCS) of subcarriers comprised in any sub-band comprised by the first sub-band set is equal to the first SCS.

According to one aspect of the present disclosure, the above method is characterized in that the first scheduling cell subset comprises Y1 serving cells, Y1 being a positive integer greater than 1, the combination employed by the serving cells comprised by the first scheduling cell subset is used to determine Y1 candidate time windows respectively in the Y1 serving cells, any of the Y1 candidate time windows belonging to the first time window.

In one embodiment, any of the Y1 candidate time windows belonging to the first time window ensures that spans in multiple serving cells in which PDCCH monitorings are performed are aligned, so as to support effective sharing of PDCCH candidates and non-overlapped CCEs, which further reduces the probability of PDCCH blocking, thus enhancing the system's scheduling performance.

The present disclosure provides a method in a second node for wireless communications, comprising:

transmitting a first information block and receiving a second information block, the first information block being used to determine a scheduled cell set, the scheduled cell set comprising more than one serving cell, the scheduled cell set comprises a first scheduled cell subset, the first scheduled cell subset comprising a positive integer number of serving cell(s), and any serving cell comprised by the first scheduled cell subset belonging to the scheduled cell set;

determining M1 control channel candidates in a first time window, the M1 control channel candidates occupying M2 control channel elements, M1 being a positive integer greater than 1, and M2 being a positive integer greater than 1, and the first time window comprising a positive integer number of time-domain consecutive multicarrier symbols;

herein, a first scheduling cell subset comprises scheduling cell(s) of serving cell(s) comprised by the first scheduled cell subset, and the M1 control channel candidates are monitored in serving cell(s) comprised by the first scheduling cell subset, the first scheduling cell subset comprising a positive integer number of serving cell(s); the second information block is used to indicate a combination employed by the serving cell(s) comprised by the first scheduling cell subset, and the combination employed by the serving cell(s) comprised by the first scheduling cell subset comprises two positive integers; a subcarrier spacing (SCS) of subcarriers occupied by one of the M2 control channel elements in frequency domain is equal to a first SCS, and the first SCS is used to determine a time length of a multicarrier symbol comprised by the first time window, and the combination employed by the serving cell(s) comprised by the first scheduling cell subset is used to determine a number of multicarrier symbols comprised by the first time window; M1 is no greater than a first threshold, M2 is no greater than a second threshold, and both the first threshold and the second threshold are positive integers; a number of serving cell(s) comprised by the first scheduled cell subset and a number of serving cells comprised by the scheduled cell set are jointly used to determine the first threshold and the second threshold.

According to one aspect of the present disclosure, the above method is characterized in employing a first-type monitoring capability in a scheduling cell of any serving cell comprised by the scheduled cell set, the first information block being used to indicate the first-type monitoring capability; no more than one control resource set (CORESET) pool is provided in the scheduling cell of any serving cell comprised by the scheduled cell set.

According to one aspect of the present disclosure, the above method is characterized in that a ratio of the number of serving cell(s) comprised by the first scheduled cell subset to a number of serving cell(s) comprised by the scheduled cell set being associated with at least one control channel candidate is used to determine a first parameter; the first threshold is equal to a maximum integer no greater than a first intermediate value, and the first intermediate value is proportional to the first parameter; the second threshold is equal to a maximum integer no greater than a second intermediate value, and the second intermediate value is proportional to the first parameter.

According to one aspect of the present disclosure, the above method is characterized in that a second parameter is used to determine the first threshold and the second threshold, the second parameter being a positive integer; the second parameter is equal to the number of serving cells comprised by the scheduled cell set; or, comprising:

receiving a third information block;

herein, the third information block is used to indicate the second parameter.

According to one aspect of the present disclosure, the above method is characterized in that the first SCS is one of X candidate SCSs, X being a positive integer greater than 1; the X candidate SCSs respectively correspond to X first-type candidate parameters, and any of the X first-type candidate parameters is a positive integer, the X candidate SCSs respectively correspond to X second-type candidate parameters, and any of the X second-type candidate parameters is a positive integer; a third parameter is one of the X first-type candidate parameters, and the third parameter is used to determine the first threshold; a fourth parameter is one of the X second-type candidate parameters, and the fourth parameter is used to determine the second threshold; the first SCS is used to determine the third parameter out of the X first-type candidate parameters, and the first SCS is used to determine the fourth parameter out of the X second-type candidate parameters.

According to one aspect of the present disclosure, the above method is characterized in comprising:

transmitting a fourth information block;

herein, the fourth information block is used to determine M3 control resource sets, M3 being a positive integer greater than 1, and a control resource set to which any one of the M2 control channel elements belongs is one of the M3 control resource sets; the second information block is used to indicate a target combination set, the target combination set comprising a positive integer number of combination(s), a combination employed by the serving cell(s) comprised by the first scheduling cell subset belongs to the target combination set; the number of multicarrier symbols comprised by the first time window is equal to a larger value between a first symbol quantity and a second symbol quantity; the first symbol quantity is equal to a maximum value of numbers of multicarrier symbols respectively occupied by the M3 control resource sets in time domain, while the second symbol quantity is equal to a minimum value of positive integers comprised by the combination(s) in the target combination set.

According to one aspect of the present disclosure, the above method is characterized in comprising:

transmitting a fifth information block;

herein, the fifth information block is used to indicate the M1 control channel candidates; a first control channel candidate is one of the M1 control channel candidates, and a second control channel candidate is one of the M1 control channel candidates other than the first control channel candidate; control channel elements occupied by the first control channel candidate are different from control channel elements occupied by the second control channel candidate, or a scrambling used by the first control channel candidate is different from a scrambling used by the second control channel candidate, or a payload size of a downlink control information (DCI) format corresponding to the first control channel candidate is different from a payload size of a DCI format corresponding to the second control channel candidate.

According to one aspect of the present disclosure, the above method is characterized in that a first control channel element is one of the M2 control channel elements, and a second control channel element is one of the M2 control channel elements other than the first control channel element; the first control channel element and the second control channel element respectively belong to different control resource sets, or a control channel candidate occupying the first control channel element and a control channel candidate occupying the second control channel element respectively start with different symbols in time domain.

According to one aspect of the present disclosure, the above method is characterized in that the M1 control channel candidates are monitored in sub-band(s) comprised by a first sub-band set, the first sub-band set comprising a positive integer number of serving cell(s); a serving cell to which any sub-band comprised by the first sub-band set belongs in frequency domain belongs to the first scheduling cell subset; a subcarrier spacing (SCS) of subcarriers comprised in any sub-band comprised by the first sub-band set is equal to the first SCS.

According to one aspect of the present disclosure, the above method is characterized in that the first scheduling cell subset comprises Y1 serving cells, Y1 being a positive integer greater than 1, the combination employed by the serving cells comprised by the first scheduling cell subset is used to determine Y1 candidate time windows respectively in the Y1 serving cells, any of the Y1 candidate time windows belonging to the first time window.

The present disclosure provides a first node for wireless communications, comprising:

a first transceiver, which receives a first information block and transmits a second information block, the first information block being used to determine a scheduled cell set, the scheduled cell set comprising more than one serving cell, the scheduled cell set comprises a first scheduled cell subset, the first scheduled cell subset comprising a positive integer number of serving cell(s), and any serving cell comprised by the first scheduled cell subset belonging to the scheduled cell set;

a first receiver, which monitors M1 control channel candidates in a first time window, the M1 control channel candidates occupying M2 control channel elements, M1 being a positive integer greater than 1, and M2 being a positive integer greater than 1, and the first time window comprising a positive integer number of time-domain consecutive multicarrier symbols;

herein, a first scheduling cell subset comprises scheduling cell(s) of serving cell(s) comprised by the first scheduled cell subset, and the M1 control channel candidates are monitored in serving cell(s) comprised by the first scheduling cell subset, the first scheduling cell subset comprising a positive integer number of serving cell(s); the second information block is used to indicate a combination employed by the serving cell(s) comprised by the first scheduling cell subset, and the combination employed by the serving cell(s) comprised by the first scheduling cell subset comprises two positive integers; a subcarrier spacing (SCS) of subcarriers occupied by one of the M2 control channel elements in frequency domain is equal to a first SCS, and the first SCS is used to determine a time length of a multicarrier symbol comprised by the first time window, and the combination employed by the serving cell(s) comprised by the first scheduling cell subset is used to determine a number of multicarrier symbols comprised by the first time window; M1 is no greater than a first threshold, M2 is no greater than a second threshold, and both the first threshold and the second threshold are positive integers; a number of serving cell(s) comprised by the first scheduled cell subset and a number of serving cells comprised by the scheduled cell set are jointly used to determine the first threshold and the second threshold.

The present disclosure provides a second node for wireless communications, comprising:

a second transceiver, which transmits a first information block and receives a second information block, the first information block being used to indicate a scheduled cell set, the scheduled cell set comprising more than one serving cell, the scheduled cell set comprises a first scheduled cell subset, the first scheduled cell subset comprising a positive integer number of serving cell(s), and any serving cell comprised by the first scheduled cell subset belonging to the scheduled cell set;

a first transmitter, which determines M1 control channel candidates in a first time window, the M1 control channel candidates occupying M2 control channel elements, M1 being a positive integer greater than 1, and M2 being a positive integer greater than 1, and the first time window comprising a positive integer number of time-domain consecutive multicarrier symbols;

herein, a first scheduling cell subset comprises scheduling cell(s) of serving cell(s) comprised by the first scheduled cell subset, and the M1 control channel candidates are monitored in serving cell(s) comprised by the first scheduling cell subset, the first scheduling cell subset comprising a positive integer number of serving cell(s); the second information block is used to indicate a combination employed by the serving cell(s) comprised by the first scheduling cell subset, and the combination employed by the serving cell(s) comprised by the first scheduling cell subset comprises two positive integers; a subcarrier spacing (SCS) of subcarriers occupied by one of the M2 control channel elements in frequency domain is equal to a first SCS, and the first SCS is used to determine a time length of a multicarrier symbol comprised by the first time window, and the combination employed by the serving cell(s) comprised by the first scheduling cell subset is used to determine a number of multicarrier symbols comprised by the first time window; M1 is no greater than a first threshold, M2 is no greater than a second threshold, and both the first threshold and the second threshold are positive integers; a number of serving cell(s) comprised by the first scheduled cell subset and a number of serving cells comprised by the scheduled cell set are jointly used to determine the first threshold and the second threshold.

In one embodiment, the methods provided in the present disclosure have the following advantages:

The method in the present disclosure supports sharing the capability of blind detection of PDCCH Candidates and channel estimation of non-overlapped CCEs in accordance with a combination configuration of scheduling cells of a serving cell rather than by the serving cell itself, so that when Cross Carrier Scheduling is applied, the mismatch between assigned numbers of PDCCH candidates and non-overlapped CCEs and actually required numbers of PDCCH candidates and non-overlapped CCEs resulting from different combination configurations of a scheduling carrier and a scheduled carrier will be handled, thus reducing the PDCCH blocking rate and improving the scheduling performance.

By using the method proposed herein, the issue of PDCCH candidates and non-overlapped CCEs assigned to a scheduling cell being beyond the scheduling cell's PDCCH monitoring capability can be avoided when supporting span-based PDCCH monitoring, thereby guaranteeing the correct PDCCH reception.

The method in the present disclosure sets a restriction on simultaneous performing of multi-PDCCH monitoring and span-based PDCCH monitoring in multi-TRP and multi-panel transmissions to realize design optimization customized to fit practical needs, thus avoiding unnecessarily increasing UE complexity and reducing the implementation cost, and finally simplifying the design.

The method in the present disclosure ensures that spans of PDCCH monitorings respectively performed in multiple serving cells are aligned, so as to support effective sharing of PDCCH candidates and non-overlapped CCEs, thereby reducing the chance of PDCCH blocking and enhancing the system's scheduling performance.

BRIEF DESCRIPTION OF THE DRAWINGS

Other features, objects and advantages of the present disclosure will become more apparent from the detailed description of non-restrictive embodiments taken in conjunction with the following drawings.

DESCRIPTION OF THE EMBODIMENTS

The technical scheme of the present disclosure is described below in further details in conjunction with the drawings. It should be noted that the embodiments of the present disclosure and the characteristics of the embodiments may be arbitrarily combined if no conflict is caused.

Embodiment 1

Figure 1:
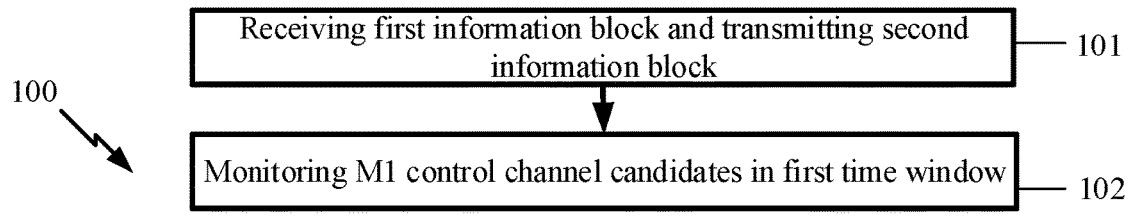
FIG. 1 illustrates a flowchart of a first information block, a second information block and M1 control channel candidates according to one embodiment of the present disclosure.

Embodiment 1 illustrates a flowchart of a first information block, a second information block and M1 control channel candidates according to one embodiment of the present disclosure, as shown in FIG. 1. In FIG. 1, each box represents a step, and it is particularly underlined that the order in which the boxes are arranged does not imply a chronological sequence of each step respectively marked.

In Embodiment 1, the first node in the present disclosure receives a first information block and transmits a second information block in step 101, the first information block being used to determine a scheduled cell set, the scheduled cell set comprising more than one serving cell, the scheduled cell set comprises a first scheduled cell subset, the first scheduled cell subset comprising a positive integer number of serving cell(s), and any serving cell comprised by the first scheduled cell subset belonging to the scheduled cell set; the first node in the present disclosure monitors M1 control channel candidates in a first time window in step 102, the M1 control channel candidates occupying M2 control channel elements, M1 being a positive integer greater than 1, and M2 being a positive integer greater than 1, and the first time window comprising a positive integer number of time-domain consecutive multicarrier symbols; herein, a first scheduling cell subset comprises scheduling cell(s) of serving cell(s) comprised by the first scheduled cell subset, and the M1 control channel candidates are monitored in serving cell(s) comprised by the first scheduling cell subset, the first scheduling cell subset comprising a positive integer number of serving cell(s); the second information block is used to indicate a combination employed by the serving cell(s) comprised by the first scheduling cell subset, and the combination employed by the serving cell(s) comprised by the first scheduling cell subset comprises two positive integers; a subcarrier spacing (SCS) of subcarriers occupied by one of the M2 control channel elements in frequency domain is equal to a first SCS, and the first SCS is used to determine a time length of a multicarrier symbol comprised by the first time window, and the combination employed by the serving cell(s) comprised by the first scheduling cell subset is used to determine a number of multicarrier symbols comprised by the first time window; M1 is no greater than a first threshold, M2 is no greater than a second threshold, and both the first threshold and the second threshold are positive integers; a number of serving cell(s) comprised by the first scheduled cell subset and a number of serving cells comprised by the scheduled cell set are jointly used to determine the first threshold and the second threshold.

In one embodiment, the first information block is transmitted via an air interface.

In one embodiment, the first information block is transmitted via a wireless interface.

In one embodiment, the first information block comprises all or part of a higher layer signaling.

In one embodiment, the first information block comprises all or part of a physical layer signaling.

In one embodiment, the first information block comprises all or part of a Radio Resource Control (RRC) signaling.

In one embodiment, the first information block comprises all or part of a Medium Access Control (MAC) layer signaling.

In one embodiment, the first information block is transmitted through a Physical Downlink Shared Channel (PDSCH).

In one embodiment, the first information block is UE-specific.

In one embodiment, the first information block is configured Per Serving Cell.

In one embodiment, the first information block comprises all or part of fields of a Downlink Control Information (DCI) signaling.

In one embodiment, the phrase of the first information block being used to determine a scheduled cell set includes a meaning that the first information block comprises K1 sub-information-block(s), K1 being smaller than the number of serving cells comprised in the scheduled cell set by 1, the K1 sub-information-block(s) is(are) respectively used to determine K1 serving cell(s), and any of the K1 serving cell(s) belongs to the scheduled cell set.

In one embodiment, the first information block comprises an IE "CellGroupConfig" in an RRC signaling.

In one embodiment, the first information block comprises a field "sCellToAddModList" in an IE "CellGroupConfig" in an RRC signaling.

In one embodiment, the first information block comprises a field "sCellToReleaseList" in an IE "CellGroupConfig" in an RRC signaling.

In one embodiment, the phrase of the first information block being used to determine a scheduled cell set includes a meaning that the first information block comprises K1 sub-information-block(s), K1 being smaller than the number of serving cells comprised in the scheduled cell set by 1, the K1 sub-information-block(s) is(are) respectively used to determine K1 serving cell(s), and any of the K1 serving cell(s) belongs to the scheduled cell set, and the K1 sub-information-block(s) comprises(comprise) an IE "SCell-Config" in an RRC signaling.

In one embodiment, the phrase of the first information block being used to determine a scheduled cell set includes a meaning that the first information block is used by the first node in the present disclosure for determining the scheduled cell set.

In one embodiment, the phrase of the first information block being used to determine a scheduled cell set includes a meaning that the first information block is used for explicitly indicating the scheduled cell set.

In one embodiment, the phrase of the first information block being used to determine a scheduled cell set includes a meaning that the first information block is used for implicitly indicating the scheduled cell set.

In one embodiment, the phrase of the first information block being used to determine a scheduled cell set includes a meaning that the first information block is used for indirectly indicating the scheduled cell set.

In one embodiment, the phrase of the first information block being used to determine a scheduled cell set includes a meaning that a scheduling cell of any serving cell comprised by the scheduled cell set employs the first-type monitoring capability in the present disclosure, and the first information block is used for indicating the first-type monitoring capability.

In one embodiment, the phrase of the first information block being used to determine a scheduled cell set includes a meaning that any serving cell comprised by the scheduled cell set belongs to a configured cell set, and the configured cell set comprises a positive integer number of serving cell(s), the number of serving cell(s) comprised by the configured cell set being no less than a number of serving cell(s) comprised by the scheduled cell set; the first information block indicates monitoring capability employed by each serving cell comprised by the configured cell set, and the monitoring capability employed by each serving cell comprised by the configured cell set is either the first-type monitoring capability or a second-type monitoring capability in the present disclosure, the second-type monitoring capability being different from the first-type monitoring capability; serving cell(s) employing the first-type monitoring capability comprised by the configured cell set composes (compose) the scheduled cell set.

In one embodiment, the scheduled cell set comprises all serving cells configured for the first node.

In one embodiment, the scheduled cell set comprises part of serving cells configured for the first node.

In one embodiment, any serving cell comprised by the scheduled cell set is an Activated Cell.

In one embodiment, the scheduled cell set comprises a serving cell that is a Deactivated Cell.

In one embodiment, the number of serving cells comprised by the scheduled cell set is equal to 2.

In one embodiment, the number of serving cells comprised by the scheduled cell set is greater than 2.

In one embodiment, the number of serving cells comprised by the scheduled cell set is no greater than 16.

In one embodiment, any two serving cells comprised by the scheduled cell set are different.

In one embodiment, any serving cell comprised by the scheduled cell set corresponds to a Component Carrier (CC).

In one embodiment, the scheduled cell set at least comprises a Primary Cell (Pcell) and a Secondary Cell (Scell).

In one embodiment, CCs corresponding to any two serving cells comprised by the scheduled cell set are different.

In one embodiment, any serving cell comprised by the scheduled cell set is only scheduled by one scheduling cell.

In one embodiment, a serving cell comprised by the scheduled cell set is scheduled by more than one scheduling cell.

In one embodiment, a Primary Cell (Pcell) comprised by the scheduled cell set is scheduled by a Secondary Cell.

In one embodiment, a Primary Cell (Pcell) comprised by the scheduled cell set is only self-scheduled.

In one embodiment, a Primary Cell (Pcell) comprised by the scheduled cell set is simultaneously self-scheduled and Cross Carrier Scheduled.

In one embodiment, all serving cells comprised by the scheduled cell set belong to a same Cell Group.

In one embodiment, the scheduled cell set comprises two serving cells that belong to different Cell Groups.

In one embodiment, all serving cells comprised by the scheduled cell set belong to a same Master Cell Group (MCG).

In one embodiment, all serving cells comprised by the scheduled cell set belong to a same Secondary Cell Group (SCG).

In one embodiment, the first scheduled cell subset only comprises one serving cell.

In one embodiment, the number of serving cells comprised by the first scheduled cell subset is equal to 2.

In one embodiment, the number of serving cells comprised by the first scheduled cell subset is greater than 2.

In one embodiment, the number of serving cells comprised by the first scheduled cell subset is less than the number of serving cells comprised by the scheduled cell set.

In one embodiment, the number of serving cells comprised by the first scheduled cell subset is equal to the number of serving cells comprised by the scheduled cell set.

In one embodiment, the scheduled cell set comprises a serving cell that does not belong to the first scheduled cell subset.

In one embodiment, any serving cell comprised by the scheduled cell set belongs to the first scheduled cell subset.

In one embodiment, the scheduled cell set and the first scheduled cell subset comprise same serving cells.

In one embodiment, the second information block is transmitted via an air interface.

In one embodiment, the second information block is transmitted via a wireless interface.

In one embodiment, the second information block comprises all or part of a higher layer signaling.

In one embodiment, the second information block comprises all or part of a physical layer signaling.

In one embodiment, the second information block comprises all or part of a Radio Resource Control (RRC) signaling.

In one embodiment, the second information block is transmitted through an Uplink Shared Channel (UL-SCH).

In one embodiment, the second information block is transmitted through a Physical Uplink Shared Channel (PUSCH).

In one embodiment, the second information block comprises Serving Cell Specific information.

In one embodiment, the second information block comprises band-specific information.

In one embodiment, the second information block comprises information of each serving cell of multiple serving cells.

In one embodiment, the second information block is used for indicating a capability of the first node in the present disclosure.

In one embodiment, the phrase that "the second information block is used to indicate a combination employed by the serving cell(s) comprised by the first scheduling cell subset" includes a meaning that the second information block is used by the first node in the present disclosure for indicating the combination employed by the serving cell(s) comprised by the first scheduling cell subset.

In one embodiment, the phrase that "the second information block is used to indicate a combination employed by the serving cell(s) comprised by the first scheduling cell subset" includes a meaning that the second information block is used for explicitly indicating the combination employed by the serving cell(s) comprised by the first scheduling cell subset.

In one embodiment, the phrase that "the second information block is used to indicate a combination employed by the serving cell(s) comprised by the first scheduling cell subset" includes a meaning that the second information block is used for implicitly indicating the combination employed by the serving cell(s) comprised by the first scheduling cell subset.

In one embodiment, the phrase that "the second information block is used to indicate a combination employed by the serving cell(s) comprised by the first scheduling cell subset" includes a meaning that the second information block is used for indicating a combination employed by each serving cell comprised by the first scheduling cell subset.

In one embodiment, the phrase that "the second information block is used to indicate a combination employed by the serving cell(s) comprised by the first scheduling cell subset" includes a meaning that the second information block comprises K2 sub-information-blocks, K2 being equal to the number of serving cells comprised by the first scheduling cell subset, and the K2 sub-information-blocks are used for respectively indicating combinations respectively employed by the K2 serving cells comprised in the first scheduling cell subset.

In one embodiment, the phrase that "the second information block is used to indicate a combination employed by the serving cell(s) comprised by the first scheduling cell subset" includes a meaning that any two serving cells comprised by the first scheduling cell subset employ a same combination, and the second information block is used for indicating a combination employed by any serving cell comprised by the first scheduling cell subset.

In one embodiment, the phrase that "the second information block is used to indicate a combination employed by the serving cell(s) comprised by the first scheduling cell subset" includes a meaning that a scheduling cell set comprises scheduling cells of serving cells comprised by the scheduled cell set, and the second information block comprises K3 sub-information-blocks, K3 being equal to a number of serving cells comprised by the scheduling cell set, and the K3 sub-information-blocks being used for respectively indicating combinations respectively employed by the K3 serving cells comprised in the scheduling cell set; any serving cell comprised by the first scheduling cell subset belongs to the scheduling cell set.

In one embodiment, the phrase that "the second information block is used to indicate a combination employed by the serving cell(s) comprised by the first scheduling cell subset" includes a meaning that the second information block comprises K4 sub-information-blocks, and the K4 sub-information-blocks are used for respectively indicating combinations employed by K4 bands, the K4 bands comprises a band to which any serving cell comprised by the first scheduling cell subset belongs in frequency domain, and a combination employed by any serving cell comprised by the first scheduling cell subset is a combination employed by a band to which the serving cell belongs, K4 being a positive integer.

In one embodiment, the phrase that "the second information block is used to indicate a combination employed by the serving cell(s) comprised by the first scheduling cell subset" includes a meaning that the second information block is used for indicating a candidate combination set employed by serving cells comprised in the first scheduling cell subset, and the candidate combination set employed by the serving cells comprised in the first scheduling cell subset comprises more than one candidate combination, and a combination employed by the serving cells comprised in the first scheduling cell subset is a candidate combination in the candidate combination set employed by the serving cells comprised in the first scheduling cell subset.

In one embodiment, the second information block is used to indicate a CA or DC capability of the first node.

In one embodiment, the second information block comprises one or more fields of an IE "Phy-Parameters".

In one embodiment, the second information block comprises a field "pdcch-MonitoringAnyOccasionsWithSpanGap" of an IE "hy-Parameters".

In one embodiment, the first time window is a Span.

In one embodiment, any multicarrier symbol comprised by the first time window is an Orthogonal Frequency Division Multiplexing (OFDM) Symbol.

In one embodiment, any multicarrier symbol comprised by the first time window is a Discrete Fourier Transform-Spread Orthogonal Frequency Division Multiplexing (DFT-s-OFDM) Symbol.

In one embodiment, a number of multicarrier symbol(s) comprised in the first time window is equal to 1.

In one embodiment, the number of multicarrier symbols comprised in the first time window is greater than 1.

In one embodiment, the number of multicarrier symbols comprised in the first time window is equal to either 2 or 3.

In one embodiment, the number of multicarrier symbol(s) comprised in the first time window is equal to 1 or 2, or 3.

In one embodiment, the number of multicarrier symbols comprised in the first time window is less than 14.

In one embodiment, the number of multicarrier symbols comprised in the first time window is less than 12.

In one embodiment, the first time window is a Slot.

In one embodiment, the first time window is a time interval of a minimum length between two earliest OFDM symbols respectively comprised in two PDCCH Occasions.

In one embodiment, a time-domain resource occupied by any of the M1 control channel candidates is a part of the first time window.

In one embodiment, a time-domain resource occupied by any of the M1 control channel candidates belongs to the first time window.

In one embodiment, the monitoring on the M1 control channel candidates is implemented through decoding of the M1 control channel elements.

In one embodiment, the monitoring on the M1 control channel candidates is implemented through blind decoding of the M1 control channel elements.

In one embodiment, the monitoring on the M1 control channel candidates is implemented through decoding and CRC check of the M1 control channel elements.

In one embodiment, the monitoring on the M1 control channel candidates is implemented through decoding and Radio-Network-Temporary-Identity-scrambled (RNTI-scrambled) CRC check of the M1 control channel elements.

In one embodiment, the monitoring on the M1 control channel candidates is implemented through decoding of the M1 control channel elements based on one or more formats of Downlink Control Information (DCI) being monitored.

In one embodiment, any of the M1 control channel candidates occupies a positive integer number of Control Channel Element(s) (CCE(s)).

In one embodiment, any of the M1 control channel candidates occupies one of 1 CCE, 2, CCEs, 4 CCEs, 8 CCEs or 16CCEs.

In one embodiment, any of the M1 control channel candidates occupies a positive integer number of Resource Element(s) (RE(s)) in time-frequency domain.

In one embodiment, any of the M1 control channel candidates occupies a time-frequency resource in time-frequency domain.

In one embodiment, any of the M1 control channel candidates is a PDCCH Candidate.

In one embodiment, any of the M1 control channel candidates is a Monitored PDCCH Candidate.

In one embodiment, any of the M1 control channel candidates is a PDCCH Candidate employing one or more DCI formats.

In one embodiment, any of the M1 control channel candidates is a PDCCH Candidate employing one or more DCI Payload Sizes.

In one embodiment, any of the M1 control channel candidates is a time-frequency resource set carrying specific DCI of one or more formats.

In one embodiment, the M1 control channel candidates comprise two control channel candidates occupying a same time-frequency resource.

In one embodiment, CCEs respectively occupied by any two of the M1 control channel candidates are different.

In one embodiment, there are two of the M1 control channel candidates occupying a same CCE.

In one embodiment, any two of the M1 control channel candidates are of different characteristic properties, each of the characteristic properties comprising at least one of CCE(s) occupied, a scrambling employed or a corresponding DCI Payload Size.

In one embodiment, any of the M2 control channel elements is occupied by at least one PDCCH Candidate.

In one embodiment, any of the M1 control channel candidates (PDCCH Candidate) occupies one or more of the M2 control channel elements.

In one embodiment, two independent Channel Estimations are required for any two of the M2 control channel elements.

In one embodiment, Channel Estimations respectively for any two of the M2 control channel elements cannot be mutually reused.

In one embodiment, two independent Channel Equalizations are required for any two of the M2 control channel elements.

In one embodiment, any of the M2 control channel elements is a PDCCH CCE.

In one embodiment, any of the M2 control channel elements is a Non-Overlapped CCE.

In one embodiment, any two of the M2 control channel elements are non-overlapped.

In one embodiment, any two of the M2 control channel elements comprise equal numbers of time-frequency resource units.

In one embodiment, any two of the M2 control channel elements comprises equal numbers of Resource Elements (RE).

In one embodiment, any of the M2 control channel elements comprises 6 Resource Element Groups (REGs).

In one embodiment, any of the M2 control channel elements comprises 6 Resource Element Groups (REGs), of which each REG comprises 9 REs used for transmitting data modulation symbols and 3 resource units used for transmitting Reference Signals (RS).

In one embodiment, time-frequency resources respectively occupied by any two of the M2 control channel elements are orthogonal.

In one embodiment, there are two control channel elements among the M2 control channel elements that occupy non-orthogonal time-frequency resources.

In one embodiment, there are two control channel elements among the M2 control channel elements that occupy a same time-frequency resource.

In one embodiment, time-frequency resources respectively occupied by any two of the M2 control channel elements are different.

In one embodiment, any control channel element occupied by the M1 control channel candidates is one of the M2 control channel elements.

In one embodiment, there is a control channel candidate among the M1 control channel candidates occupying a control channel element other than the M2 control channel elements.

In one embodiment, any of the M2 control channel elements is occupied by at least one of the M1 control channel candidates.

In one embodiment, the M2 control channel elements comprise all control channel elements occupied by any of the M1 control channel candidates.

In one embodiment, an SCS of subcarriers occupied by any of the M2 control channel elements in frequency domain is equal to an SCS configured for an Active BWP to which any of the M2 control channel elements belongs in frequency domain.

In one embodiment, the M2 control channel elements respectively belong to M3 Active BWPs in frequency domain, and an SCS of subcarriers comprised by any one of the M3 Active BWPs is equal to the first SCS, M3 being a positive integer.

In one embodiment, any of the M2 control channel elements belongs to a sub-band comprised by the first sub-band set in the present disclosure in frequency domain.

In one embodiment, any two subcarriers occupied by the M2 control channel elements are spaced by an equal SCS.

In one embodiment, an SCS of subcarriers occupied by any of the M2 control channel elements in frequency domain is equal to the first SCS.

In one embodiment, an SCS of any subcarrier occupied by any of the M2 control channel elements in frequency domain is equal to the first SCS.

In one embodiment, the first scheduling cell subset only comprises one serving cell.

In one embodiment, the first scheduling cell subset comprises more than one serving cell.

In one embodiment, any serving cell comprised by the first scheduling cell subset is an activated cell.

In one embodiment, the first scheduling cell subset comprises a serving cell being a deactivated cell.

In one embodiment, any serving cell comprised by the first scheduling cell subset comprises an Active BWP.

In one embodiment, the first scheduling cell subset comprises a serving cell being a Non-active BWP.

In one embodiment, any serving cell comprised by the first scheduling cell subset belongs to the scheduled cell set.

In one embodiment, the first scheduling cell subset comprises a serving cell being a not belonging to the scheduled cell set.

In one embodiment, the first scheduling cell subset comprises a serving cell being a serving cell outside the scheduled cell set.

In one embodiment, the phrase that "a first scheduling cell subset comprises scheduling cell(s) of serving cell(s) comprised by the first scheduled cell subset" includes a meaning that the first scheduling cell subset comprises all scheduling cells of serving cell(s) comprised by the first scheduled cell subset.

In one embodiment, the phrase that "a first scheduling cell subset comprises scheduling cell(s) of serving cell(s) comprised by the first scheduled cell subset" includes a meaning that the first scheduling cell subset only comprises scheduling cell(s) of serving cell(s) comprised by the first scheduled cell subset.

In one embodiment, the phrase that "a first scheduling cell subset comprises scheduling cell(s) of serving cell(s) comprised by the first scheduled cell subset" includes a meaning that any serving cell scheduled by a serving cell comprised by the first scheduling cell subset belongs to the first scheduled cell subset.

In one embodiment, the phrase that "a first scheduling cell subset comprises scheduling cell(s) of serving cell(s) comprised by the first scheduled cell subset" includes a meaning that the first scheduling cell subset comprises a scheduling cell of any serving cell comprised by the first scheduled cell subset.

In one embodiment, the phrase that "a first scheduling cell subset comprises scheduling cell(s) of serving cell(s) comprised by the first scheduled cell subset" includes a meaning that the first scheduling cell subset also comprises a serving cell other than a scheduling cell of a serving cell comprised by the first scheduled cell subset.

In one embodiment, the phrase that "the M1 control channel candidates are monitored in serving cell(s) comprised by the first scheduling cell subset" includes a meaning that a frequency-domain resource occupied by any one of the M1 control channel candidates belongs to a serving cell comprised in the first scheduling cell subset in frequency domain.

In one embodiment, the phrase that "the M1 control channel candidates are monitored in serving cell(s) comprised by the first scheduling cell subset" includes a meaning that a serving cell to which a frequency-domain resource occupied by any one of the M1 control channel candidates belongs is a part of the first scheduling cell subset.

In one embodiment, the phrase that "the M1 control channel candidates are monitored in serving cell(s) comprised by the first scheduling cell subset" includes a meaning that a serving cell corresponding to a CC to which a frequency-domain resource occupied by any one of the M1 control channel candidates belongs is a part of the first scheduling cell subset.

In one embodiment, the phrase that "the M1 control channel candidates are monitored in serving cell(s) comprised by the first scheduling cell subset" includes a meaning that the first scheduling cell subset comprises a frequency-domain resource occupied by any one of the M1 control channel candidates.

In one embodiment, the phrase that "the M1 control channel candidates are monitored in serving cell(s) comprised by the first scheduling cell subset" includes a meaning that any serving cell comprised by the first scheduling cell subset comprises at least one of the M1 control channel candidates.

In one embodiment, the phrase that "the M1 control channel candidates are monitored in serving cell(s) comprised by the first scheduling cell subset" includes a meaning that a serving cell to which any of the M1 control channel candidates belongs is a part of the first scheduling cell subset.

In one embodiment, "a combination employed by the serving cell(s) comprised by the first scheduling cell subset" refers to a combination employed by each serving cell comprised by the first scheduling cell subset.

In one embodiment, "a combination employed by the serving cell(s) comprised by the first scheduling cell subset" refers to a combination employed by a serving cell comprised by the first scheduling cell subset.

In one embodiment, when the number of serving cells comprised by the first scheduling cell subset is greater than 1, any two serving cells comprised by the first scheduling cell subset employ a same combination.

In one embodiment, when the number of serving cells comprised by the first scheduling cell subset is greater than 1, two serving cells comprised by the first scheduling cell subset employ different combinations.

In one embodiment, a combination employed by the serving cell(s) comprised by the first scheduling cell subset is used for indicating a capability of monitoring PDCCH of the first node in the present disclosure.

In one embodiment, a combination employed by the serving cell(s) comprised by the first scheduling cell subset is used for indicating distributions of PDCCH Monitoring Occasions supported by the first node in the present disclosure.

In one embodiment, a combination employed by the serving cell(s) comprised by the first scheduling cell subset is used for indicating a number of OFDM symbols spanned by one of two consecutive PDCCH transmissions and a minimum length of time interval between two consecutive PDCCH transmissions supported by the first node in the present disclosure.

In one embodiment, each serving cell comprised by the first scheduling cell subset employs a corresponding combination.

In one embodiment, all serving cells comprised by the first scheduling cell subset employ a same combination.

In one embodiment, a combination employed by any serving cell comprised by the first scheduling cell subset comprises two positive integers.

In one embodiment, a combination employed by the serving cell(s) comprised by the first scheduling cell subset comprises two positive integers, and the two positive integers are respectively used to indicate a number of OFDM symbols spanned by one of two consecutive PDCCH transmissions and a minimum length of time interval between two consecutive PDCCH transmissions supported by the first node in the present disclosure.

In one embodiment, a combination employed by the serving cell(s) comprised by the first scheduling cell subset is one of (2, 2), (4, 3) or (7, 3).

In one embodiment, a combination employed by the serving cell(s) comprised by the first scheduling cell subset is represented by $(X_c, Y_c)$, of which $X_c$ and $Y_c$ are two positive integers, respectively.

In one embodiment, the first SCS is measured in Hz.

In one embodiment, the first SCS is measured in kHz.

In one embodiment, the first SCS is equal to one of 15 kHz, 30 kHz, 60 kHz, 120 kHz or 240 kHz.

In one embodiment, when the first time window comprises more than one multicarrier symbol, any two multicarrier symbols comprised by the first time window are of an equal time length.

In one embodiment, when the first time window comprises more than one multicarrier symbol, the first time window comprises two multicarrier symbols that are of unequal time lengths.

In one embodiment, the phrase that "the first SCS is used to determine a time length of a multicarrier symbol comprised by the first time window" means that the first SCS is used by the first node in the present disclosure for determining a time length of a multicarrier symbol comprised by the first time window.

In one embodiment, the phrase that "the first SCS is used to determine a time length of a multicarrier symbol comprised by the first time window" means that the first SCS is used to determine a time length of any multicarrier symbol comprised by the first time window.

In one embodiment, the phrase that "the first SCS is used to determine a time length of a multicarrier symbol comprised by the first time window" means that the first SCS is used to determine a time length of any multicarrier symbol comprised by the first time window according to a mapping relation.

In one embodiment, the phrase that "the first SCS is used to determine a time length of a multicarrier symbol comprised by the first time window" means that the first SCS is used to determine a number of multicarrier symbols comprised in a subframe to which the first time window belongs, and the number of multicarrier symbols comprised in the subframe to which the first time window belongs is used to determine a time length of a multicarrier symbol comprised by the first time window.

In one embodiment, the phrase that "the first SCS is used to determine a time length of a multicarrier symbol comprised by the first time window" means that the first SCS is used to determine a number of slots comprised in a subframe to which the first time window belongs, and the number of slots comprised in the subframe to which the first time window belongs is used to determine a time length of a multicarrier symbol comprised by the first time window.

In one embodiment, the phrase that "the first SCS is used to determine a time length of a multicarrier symbol comprised by the first time window" means that a Configuration Index of the first SCS is used to determine a time length of any multicarrier symbol comprised by the first time window.

In one embodiment, the phrase that "the combination employed by the serving cell(s) comprised by the first scheduling cell subset is used to determine a number of multicarrier symbols comprised by the first time window" means that the combination employed by the serving cell(s) comprised by the first scheduling cell subset is used by the first node in the present disclosure for determining the number of multicarrier symbols comprised by the first time window.

In one embodiment, the phrase that "the combination employed by the serving cell(s) comprised by the first scheduling cell subset is used to determine a number of multicarrier symbols comprised by the first time window" is implemented by the claim 6 in the present disclosure.

In one embodiment, the phrase that "the combination employed by the serving cell(s) comprised by the first scheduling cell subset is used to determine a number of multicarrier symbols comprised by the first time window" means that a result of a linear operation of two positive integers comprised in the combination employed by the serving cell(s) comprised by the first scheduling cell subset is equal to the number of multicarrier symbols comprised by the first time window.

In one embodiment, the phrase that "the combination employed by the serving cell(s) comprised by the first scheduling cell subset is used to determine a number of multicarrier symbols comprised by the first time window" means that a smaller value between two positive integers comprised in the combination employed by the serving cell(s) comprised by the first scheduling cell subset is equal to the number of multicarrier symbols comprised by the first time window.

In one embodiment, the phrase that "the combination employed by the serving cell(s) comprised by the first scheduling cell subset is used to determine a number of multicarrier symbols comprised by the first time window" means that a larger value between two positive integers comprised in the combination employed by the serving cell(s) comprised by the first scheduling cell subset is equal to the number of multicarrier symbols comprised by the first time window.

In one embodiment, the phrase that "the combination employed by the serving cell(s) comprised by the first scheduling cell subset is used to determine a number of multicarrier symbols comprised by the first time window" means that the number of multicarrier symbols comprised by the first time window is linear with a positive integer comprised in the combination employed by the serving cell(s) comprised by the first scheduling cell subset.

In one embodiment, the phrase that "the combination employed by the serving cell(s) comprised by the first scheduling cell subset is used to determine a number of multicarrier symbols comprised by the first time window" is implemented by the claim 10 in the present disclosure.

In one embodiment, further comprising:
receiving a first synchronization signal;
herein, the first synchronization signal is used to determine a time-domain position of the first time window.

In one embodiment, further comprising:
receiving a first synchronization signal;
herein, the first synchronization signal is used to determine timing of the first time window.

In one embodiment, M1 is less than the first threshold.

In one embodiment, M1 is equal to the first threshold.

In one embodiment, M2 is less than the second threshold.

In one embodiment, M2 is equal to the second threshold.

In one embodiment, the first threshold and the second threshold may be equal or unequal.

In one embodiment, the first threshold and the second threshold are independent.

In one embodiment, the first threshold and the second threshold are unrelated.

In one embodiment, the first threshold and the second threshold are related.

In one embodiment, the first threshold and the second threshold are linearly correlated.

In one embodiment, the first threshold is proportional to the second threshold.

In one embodiment, the first node in the present disclosure is not required to monitor control channel candidates of which the number is greater than the first threshold in an active bandwidth part (BWP) employing the first SCS in the first time window.

In one embodiment, the first node in the present disclosure is not required to monitor control channel elements of which the number is greater than the second threshold in an active bandwidth part (BWP) employing the first SCS in the first time window.

In one embodiment, the first threshold is greater than 1.

In one embodiment, the second threshold is greater than 1.

In one embodiment, the first threshold is equal to 1.

In one embodiment, the second threshold is equal to 1.

In one embodiment, the phrase that "a number of serving cell(s) comprised by the first scheduled cell subset and a number of serving cells comprised by the scheduled cell set are jointly used to determine the first threshold and the second threshold" includes a meaning that the number of serving cell(s) comprised by the first scheduled cell subset and the number of serving cell(s) comprised by the scheduled cell set are jointly used by the first node in the present disclosure for determining the first threshold and the second threshold.

In one embodiment, the phrase that "a number of serving cell(s) comprised by the first scheduled cell subset and a number of serving cells comprised by the scheduled cell set are jointly used to determine the first threshold and the second threshold" includes a meaning that a ratio of the number of serving cell(s) comprised by the first scheduled cell subset to the number of serving cell(s) comprised by the scheduled cell set is used for determining the first threshold and the second threshold.

In one embodiment, the phrase that "a number of serving cell(s) comprised by the first scheduled cell subset and a number of serving cells comprised by the scheduled cell set are jointly used to determine the first threshold and the second threshold" is implemented by the claim 3 in the present disclosure.

In one embodiment, the phrase that "a number of serving cell(s) comprised by the first scheduled cell subset and a number of serving cells comprised by the scheduled cell set are jointly used to determine the first threshold and the second threshold" includes a meaning that on the condition of a given number of serving cells comprised by the scheduled cell set and the second parameter and the third parameter in the present disclosure, the first threshold is linear with the number of serving cell(s) comprised by the first scheduled cell subset, and the second threshold is linear with the number of serving cell(s) comprised by the first scheduled cell subset; on the condition of a given number of serving cell(s) comprised by the first scheduled cell subset and the second parameter and the third parameter in the present disclosure, the first threshold is linear with a reciprocal of the number of serving cells comprised by the scheduled cell set, and the second threshold is linear with a reciprocal of the number of serving cells comprised by the scheduled cell set.

In one embodiment, the phrase that "a number of serving cell(s) comprised by the first scheduled cell subset and a number of serving cells comprised by the scheduled cell set are jointly used to determine the first threshold and the second threshold" includes a meaning that a smaller value between the number of serving cell(s) comprised by the first scheduled cell subset and the number of serving cell(s) comprised by the scheduled cell set is used for determining the first threshold and the second threshold.

In one embodiment, the phrase that "a number of serving cell(s) comprised by the first scheduled cell subset and a number of serving cells comprised by the scheduled cell set are jointly used to determine the first threshold and the second threshold" includes a meaning that a larger value between the number of serving cell(s) comprised by the first scheduled cell subset and the number of serving cell(s) comprised by the scheduled cell set is used for determining the first threshold and the second threshold.

Embodiment 2

Figure 2:
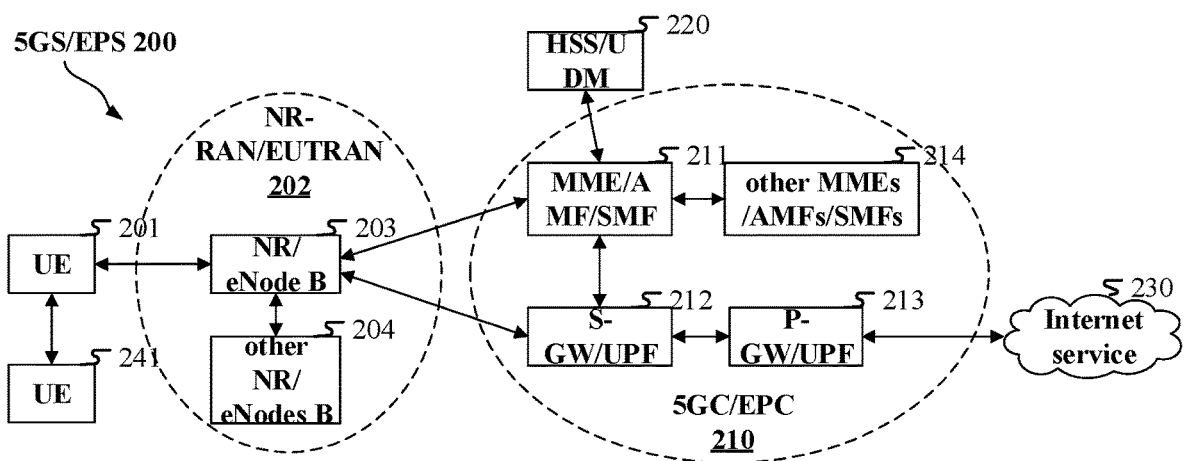
FIG. 2 illustrates a schematic diagram of a network architecture according to one embodiment of the present disclosure.

Embodiment 2 illustrates a schematic diagram of a network architecture according to the present disclosure, as shown in FIG. 2. In FIG. 2 is a diagram illustrating a network architecture 200 of 5G NR, Long-Term Evolution (LTE), and Long-Term Evolution Advanced (LTE-A) systems. The 5G NR or LTE network architecture 200 may be called an 5G System/Evolved Packet System (5GS/EPS) 200 or any other appropriate term. The 5GS/EPS 200 may comprise one or more UEs 201, an NG-RAN 202, an 5G-Core Network/Evolved Packet Core (5G-CN/EPC) 210, a Home Subscriber Server (HSS)/Unified Data Management (UDM) 220 and an Internet Service 230. The 5GS/EPS 200 may be interconnected with other access networks. For simple description, the entities/interfaces are not shown. As shown in FIG. 2, the 5GS/EPS 200 provides packet switching services. Those skilled in the art will find it easy to understand that various concepts presented throughout the present disclosure can be extended to networks providing circuit switching services or other cellular networks. The NG-RAN 202 comprises an NR node B (gNB/eNB) 203 and other gNBs(/eNBs) 204. The gNB(eNB) 203 provides UE 201-oriented user plane and control plane terminations. The gNB(eNB) 203 may be connected to other gNBs(eNBs) 204 via an Xn/X2 interface (for example, backhaul). The gNB (eNB) 203 may be called a base station, a base transceiver station, a radio base station, a radio transceiver, a transceiver function, a Base Service Set (BSS), an Extended Service Set (ESS), a Transmitter Receiver Point (TRP) or some other applicable terms. The gNB(eNB) 203 provides an access point of the 5G-CN/EPC 210 for the UE 201. Examples of UE 201 include cellular phones, smart phones, Session Initiation Protocol (SIP) phones, laptop computers, Personal Digital Assistant (PDA), Satellite Radios, Non-terrestrial base station communications, Satellite mobile communications, Global Positioning Systems (GPSs), multimedia devices, video devices, digital audio players (for example, MP3 players), cameras, games consoles, unmanned aerial vehicles, air vehicles, narrow-band physical network equipment, machine-type communication equipment, land vehicles, automobiles, wearable equipment, or any other devices having similar functions. Those skilled in the art also can call the UE 201 a mobile station, a subscriber station, a mobile unit, a subscriber unit, a wireless unit, a remote unit, a mobile device, a wireless device, a radio communication device, a remote device, a mobile subscriber station, an access terminal, a mobile terminal, a wireless terminal, a remote terminal, a handset, a user proxy, a mobile client, a client or some other appropriate terms. The gNB (eNB) 203 is connected to the 5G-CN/EPC 210 via an S1/NG interface. The 5G-CN/EPC 210 comprises a Mobility Management Entity (MME)/Authentication Management Field (AMF)/Session Management Function (SMF) 211, other MMES/AMFs/SMFs 214, a Service Gateway (S-GW)/User Plane Function (UPF) 212 and a Packet Date Network Gateway (P-GW)/UPF 213. The MME/AMF/SMF 211 is a control node for processing a signaling between the UE 201 and the 5G-CN/EPC 210. Generally, the MME/AMF/SMF 211 provides bearer and connection management. All user Internet Protocol (IP) packets are transmitted through the S-GW/UPF 212. The S-GW/UPF 212 is connected to the P-GW/UPF 213. The P-GW/UPF 213 provides UE IP address allocation and other functions. The P-GW/UPF 213 is connected to the Internet Service 230. The Internet Service 230 comprises operator-compatible IP services, specifically including Internet, Intranet, IP Multimedia Subsystem (IMS) and Packet Switching Streaming (PSS) services.

In one embodiment, the UE 201 corresponds to the first node in the present disclosure.

In one embodiment, the UE 201 supports multicarrier transmission.

In one embodiment, the UE 201 supports Span-based PDCCH transmission.

In one embodiment, the gNB(eNB)203 corresponds to the second node in the present disclosure.

In one embodiment, the gNB(eNB)203 supports multicarrier transmission.

In one embodiment, the gNB(eNB)203 supports Span-based PDCCH transmission.

Embodiment 3

Figure 3:
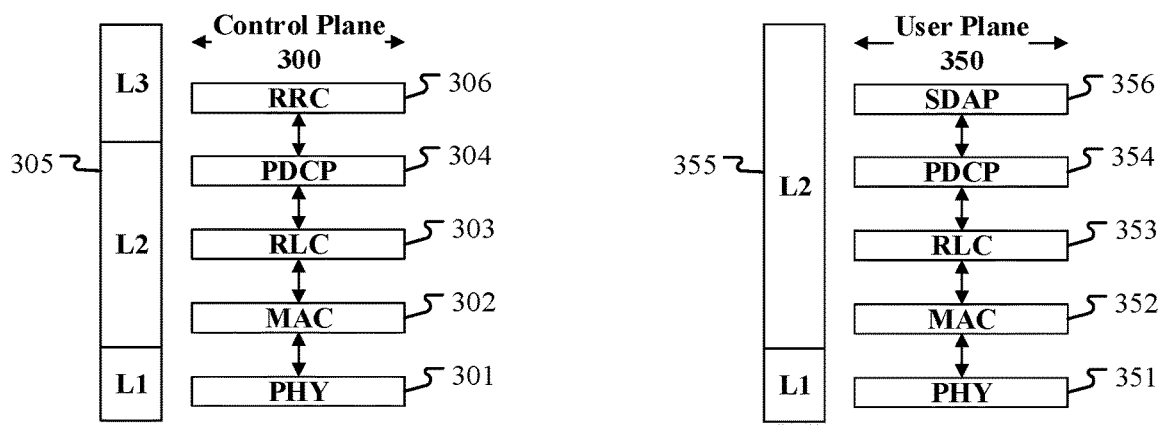
FIG. 3 illustrates a schematic diagram of a radio protocol architecture of a user plane and a control plane according to one embodiment of the present disclosure.

Embodiment 3 illustrates a schematic diagram of an embodiment of a radio protocol architecture of a user plane and a control plane according to the present disclosure, as shown in FIG. 3. FIG. 3 is a schematic diagram illustrating an embodiment of a radio protocol architecture of a user plane 350 and a control plane 300. In FIG. 3, the radio protocol architecture for a control plane 300 between a first communication node (UE or gNB) and a second communication node (gNB or UE) is represented by three layers, which are a layer 1, a layer 2 and a layer 3, respectively. The layer 1 (L1) is the lowest layer which performs signal processing functions of various PHY layers. The L1 is called PHY 301 in the present disclosure. The layer 2 (L2) 305 is above the PHY 301, and is in charge of the link between the first communication node and the second communication node, or between two UEs via the PHY 301. The L2 305 comprises a Medium Access Control (MAC) sublayer 302, a Radio Link Control (RLC) sublayer 303 and a Packet Data Convergence Protocol (PDCP) sublayer 304. All the three sublayers terminate at the second communication nodes. The PDCP sublayer 304 provides varied radio bearers and multiplexing between logical channels, and also provides securing by packet encryption, as well as support for handover of a first communication node between second communication nodes. The RLC sublayer 303 provides higher-layer packet segmentation and reassembling, retransmission of a lost packet, and also packet reordering so as to compensate for disordered reception caused by Hybrid Automatic Repeat Request (HARQ). The MAC sublayer 302 provides multiplexing of a logical channel and a transport channel. The MAC sublayer 302 is also responsible for allocating between first communication nodes various radio resources (i.e., resource block) in a cell. The MAC sublayer 302 is also in charge of HARQ operation. In the control plane 300, The RRC sublayer 306 in the L3 layer is responsible for acquiring radio resources (i.e., radio bearer) and configuring the lower layer using an RRC signaling between the second node and the first node. The radio protocol architecture in the user plane 350 comprises the L1 layer and the L2 layer. In the user plane 350, the radio protocol architecture used for the first node and the second node in a PHY layer 351, a PDCP sublayer 354 of the L2 layer 355, an RLC sublayer 353 of the L2 layer 355 and a MAC sublayer 352 of the L2 layer 355 is almost the same as the radio protocol architecture used for corresponding layers and sublayers in the control plane 300, but the PDCP sublayer 354 also provides header compression used for higher-layer packet to reduce radio transmission overhead. The L2 layer 355 in the user plane 350 also comprises a Service Data Adaptation Protocol (SDAP) sublayer 356, which is in charge of the mapping between QoS streams and a Data Radio Bearer (DRB), so as to support diversity of traffics. Although not described in FIG. 3, the first node may comprise several higher layers above the L2 355, such as a network layer (i.e., IP layer) terminated at a P-GW 213 of the network side and an application layer terminated at the other side of the connection (i.e., a peer UE, a server, etc.).

In one embodiment, the radio protocol architecture in FIG. 3 is applicable to the first node in the present disclosure.

In one embodiment, the radio protocol architecture in FIG. 3 is applicable to the second node in the present disclosure.

In one embodiment, the first information block in the present disclosure is generated by the RRC 306.

In one embodiment, the first information block in the present disclosure is generated by the MAC 302 or the MAC 352.

In one embodiment, the first information block in the present disclosure is generated by the PHY301 or the PHY351.

In one embodiment, the second information block in the present disclosure is generated by the RRC 306.

In one embodiment, the second information block in the present disclosure is generated by the MAC 302 or the MAC 352.

In one embodiment, the third information block in the present disclosure is generated by the RRC 306.

In one embodiment, the third information block in the present disclosure is generated by the MAC 302 or the MAC 352.

In one embodiment, the fourth information block in the present disclosure is generated by the RRC 306.

In one embodiment, the fourth information block in the present disclosure is generated by the MAC 302 or the MAC 352.

In one embodiment, the fourth information block in the present disclosure is generated by the PHY301 or the PHY351.

In one embodiment, the fifth information block in the present disclosure is generated by the RRC 306.

In one embodiment, the fifth information block in the present disclosure is generated by the MAC 302 or the MAC 352.

In one embodiment, the fifth information block in the present disclosure is generated by the PHY301 or the PHY351.

Embodiment 4

Figure 4:
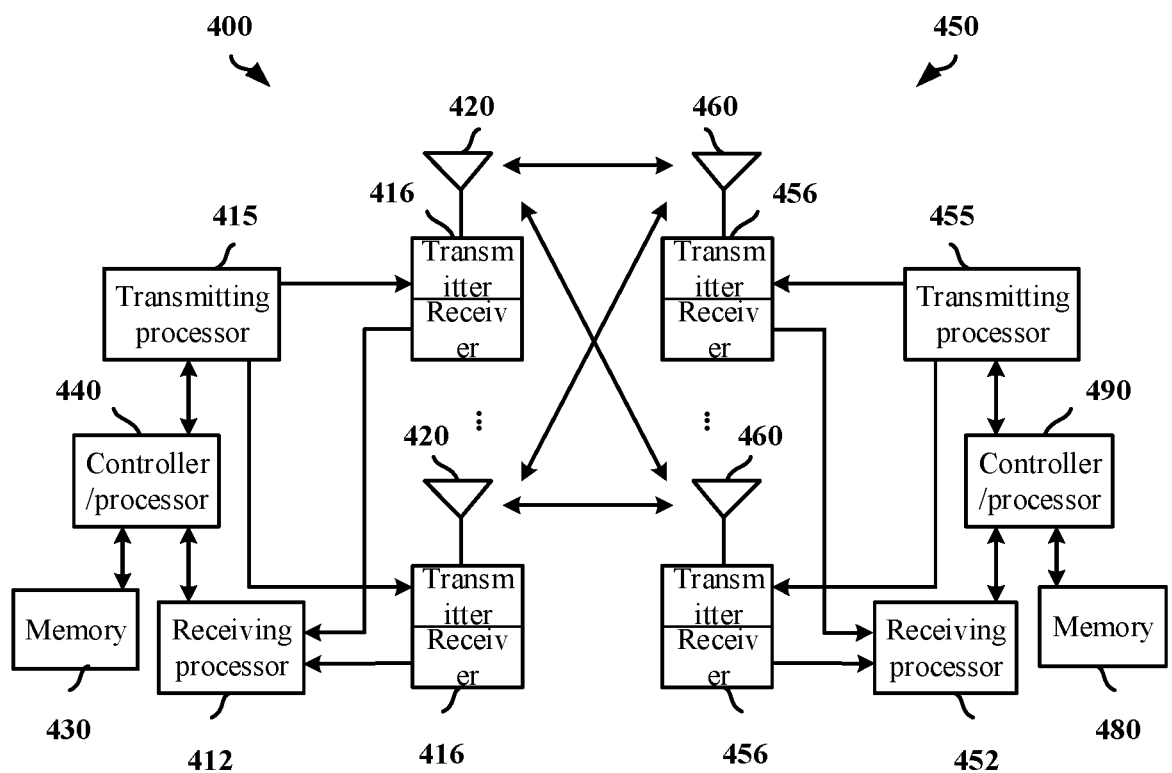
FIG. 4 illustrates a schematic diagram of a first node and a second node according to one embodiment of the present disclosure.

Embodiment 4 illustrates a schematic diagram of a first node and a second node according to the present disclosure, as shown in FIG. 4.

The first node (450) can comprise a controller/processor 490, a memory 480, a receiving processor 452, a transmitter/receiver 456 and a transmitting processor 455, the transmitter/receiver 456 comprising an antenna 460.

The second node (410) can comprise a controller/processor 440, a memory 430, a receiving processor 412, a transmitter/receiver 416 and a transmitting processor 415, the transmitter/receiver 416 comprising an antenna 420.

In a Downlink (DL) transmission, a higher layer packet, such as higher-layer information contained in a first information block, a fourth information block and a fifth information block of the present disclosure is provided to the controller/processor 440. The controller/processor 440 implements the functionality of the L2 layer and layers above. In the DL, the controller/processor 440 provides header compression, encryption, packet segmentation and reordering, multiplexing between a logical channel and a transport channel and radio resource allocation of the first node 450 based on various priorities. The controller/processor 440 is also in charge of HARQ operation, a retransmission of a lost packet and a signaling to the first node 450, for instance, the higher-layer information contained in a first information block, a fourth information block and a fifth information block of the present disclosure is generated in the controller/processor 440. The transmitting processor 415 performs various signal processing functions used for the L1 layer (i.e., PHY), such as coding, interleaving, scrambling, modulation and power control/allocation, precoding and physical layer control signaling generation. For example, the generation of physical layer signals of a first information block, a fourth information block and a fifth information block of the present disclosure is completed in the transmitting processor 415. When there is at least one among the M1 control channel candidates in the present disclosure being used for transmitting a control signaling, the generation of the control signaling transmitted is completed in the transmitting processor 415. Modulation symbols generated are divided into parallel streams and each stream is mapped onto a corresponding multicarrier subcarrier and/or multicarrier symbol, and is then mapped by the transmitting processor 415 to the antenna 420 via the transmitter 416 and transmitted in the form of a radio frequency signal. At the receiver side, each receiver 456 recovers baseband information modulation onto a radio frequency carrier and provides the baseband information to the receiving processor 452. The receiving processor 452 provides various signal receiving processing functions of the L1. The functions include receiving physical layer signals of the first information block, the fourth information block and the fifth information block in the present disclosure and monitoring the M1 control channel candidates in the present disclosure, as well as modulating based on each modulation scheme (e.g., BPSK) through multicarrier symbols in the multicarrier symbol streams, and also de-scrambling, decoding and de-interleaving to recover data or a control signal transmitted by the second node 410 on a physical channel, and then provides the data and control signal to the controller/processor 490. The controller/processor 490 is in charge of the L2 and above layers. The controller/processor 490 interprets the first information block, the fourth information block and the fifth information block. And the controller/processor is associated with the memory 480 that stores program codes and data. the memory 480 can be called a computer readable medium.

In an Uplink (UL) transmission, the memory 480 is configured to provide higher-layer data to the controller/processor 490. The memory 480 represents the L2 and protocol layers above the L2. The controller/processor 490 provides header compression, encryption, packet segmentation and reordering, as well as multiplexing between a logical channel and a transport channel based on radio resources allocation of the second node 410, so as to implement the L2 protocols used for the user plane and the control plane. The controller/processor 490 is also responsible for HARQ operation, retransmission of a lost packet, and a signaling to the second node 410. The second information block and the third information block in the present disclosure are generated in the controller/processor 490. The transmitting processor 455 performs various signal transmitting processing functions used for the L1(that is, PHY), and physical layer signals of the second information block and the third information block are generated by the transmitting processor 455. Signal transmitting processing functions include sequence generation (for signals generated by a sequence), coding and interleaving to ensure Forward Error Correction (FEC) at the UE 450 and modulation on baseband signals (for signals generated by a bit block) based on various modulation schemes. Signals generated by a sequence or modulation symbols are later divided into parallel streams and each is mapped to a corresponding multicarrier subcarrier and/or a multicarrier symbol, and then is mapped by the transmitting processor 455 to the antenna 460 via the transmitter 456 to be transmitted in the form of a radio frequency signal. The receiver 416 receives the radio frequency signal via a corresponding antenna 420. Each receiver 416 recovers baseband information modulated on a radio frequency carrier and provides the baseband information to the receiving processor 412. The receiving processor 412 provides various signal receiving processing functions for the L1, including receiving a physical layer signal carrying the second information block and the third information block of the present disclosure. The functions also include acquiring a multicarrier symbol stream, performing demodulation of multicarrier symbols comprised in the multicarrier symbol stream related to sequence-unpacking or based on modulation schemes (such as BPSK, QPSK), decoding and de-interleaving of the demodulated symbols to recover data and/or a control signal originally transmitted by the first node 450 on a physical channel. afterwards, the data and/or control signal is provided to the controller/processor 440. The controller/processor 440 implements the L2 functionality, including reading the second information block and the third information block in the present disclosure. The controller/processor can be associated with the buffer 430 that stores program codes and data. the buffer 430 can be called a computer readable medium.

In one embodiment, the first communication device 450 comprises at least one processor and at least one memory. The at least one memory comprises computer program codes; the at least one memory and the computer program codes are configured to be used in collaboration with the at least one processor. The first communication device 450 at least receives a first information block and transmits a second information block, the first information block being used to determine a scheduled cell set, the scheduled cell set comprising more than one serving cell, the scheduled cell set comprises a first scheduled cell subset, the first scheduled cell subset comprising a positive integer number of serving cell(s), and any serving cell comprised by the first scheduled cell subset belonging to the scheduled cell set; monitors M1 control channel candidates in a first time window, the M1 control channel candidates occupying M2 control channel elements, M1 being a positive integer greater than 1, and M2 being a positive integer greater than 1, and the first time window comprising a positive integer number of time-domain consecutive multicarrier symbols; herein, a first scheduling cell subset comprises scheduling cell(s) of serving cell(s) comprised by the first scheduled cell subset, and the M1 control channel candidates are monitored in serving cell(s) comprised by the first scheduling cell subset, the first scheduling cell subset comprising a positive integer number of serving cell(s); the second information block is used to indicate a combination employed by the serving cell(s) comprised by the first scheduling cell subset, and the combination employed by the serving cell(s) comprised by the first scheduling cell subset comprises two positive integers; a subcarrier spacing (SCS) of subcarriers occupied by one of the M2 control channel elements in frequency domain is equal to a first SCS, and the first SCS is used to determine a time length of a multicarrier symbol comprised by the first time window, and the combination employed by the serving cell(s) comprised by the first scheduling cell subset is used to determine a number of multicarrier symbols comprised by the first time window; M1 is no greater than a first threshold, M2 is no greater than a second threshold, and both the first threshold and the second threshold are positive integers; a number of serving cell(s) comprised by the first scheduled cell subset and a number of serving cells comprised by the scheduled cell set are jointly used to determine the first threshold and the second threshold.

In one embodiment, the first communication device 450 comprises a memory that stores a computer readable instruction program. The computer readable instruction program generates actions when executed by at least one processor. The actions include: receiving a first information block and transmitting a second information block, the first information block being used to determine a scheduled cell set, the scheduled cell set comprising more than one serving cell, the scheduled cell set comprises a first scheduled cell subset, the first scheduled cell subset comprising a positive integer number of serving cell(s), and any serving cell comprised by the first scheduled cell subset belonging to the scheduled cell set; monitors M1 control channel candidates in a first time window, the M1 control channel candidates occupying M2 control channel elements, M1 being a positive integer greater than 1, and M2 being a positive integer greater than 1, and the first time window comprising a positive integer number of time-domain consecutive multicarrier symbols; herein, a first scheduling cell subset comprises scheduling cell(s) of serving cell(s) comprised by the first scheduled cell subset, and the M1 control channel candidates are monitored in serving cell(s) comprised by the first scheduling cell subset, the first scheduling cell subset comprising a positive integer number of serving cell(s); the second information block is used to indicate a combination employed by the serving cell(s) comprised by the first scheduling cell subset, and the combination employed by the serving cell(s) comprised by the first scheduling cell subset comprises two positive integers; a subcarrier spacing (SCS) of subcarriers occupied by one of the M2 control channel elements in frequency domain is equal to a first SCS, and the first SCS is used to determine a time length of a multicarrier symbol comprised by the first time window, and the combination employed by the serving cell(s) comprised by the first scheduling cell subset is used to determine a number of multicarrier symbols comprised by the first time window; M1 is no greater than a first threshold, M2 is no greater than a second threshold, and both the first threshold and the second threshold are positive integers; a number of serving cell(s) comprised by the first scheduled cell subset and a number of serving cells comprised by the scheduled cell set are jointly used to determine the first threshold and the second threshold.

In one embodiment, the second communication device 410 comprises at least one processor and at least one memory. The at least one memory comprises computer program codes. The at least one memory and the computer program codes are configured to be used in collaboration with the at least one processor. The second communication device 410 at least transmits a first information block and receives a second information block, the first information block being used to indicate a scheduled cell set, the scheduled cell set comprising more than one serving cell, the scheduled cell set comprises a first scheduled cell subset, the first scheduled cell subset comprising a positive integer number of serving cell(s), and any serving cell comprised by the first scheduled cell subset belonging to the scheduled cell set; determines M1 control channel candidates in a first time window, the M1 control channel candidates occupying M2 control channel elements, M1 being a positive integer greater than 1, and M2 being a positive integer greater than 1, and the first time window comprising a positive integer number of time-domain consecutive multicarrier symbols; herein, a first scheduling cell subset comprises scheduling cell(s) of serving cell(s) comprised by the first scheduled cell subset, and the M1 control channel candidates are monitored in serving cell(s) comprised by the first scheduling cell subset, the first scheduling cell subset comprising a positive integer number of serving cell(s); the second information block is used to indicate a combination employed by the serving cell(s) comprised by the first scheduling cell subset, and the combination employed by the serving cell(s) comprised by the first scheduling cell subset comprises two positive integers; a subcarrier spacing (SCS) of subcarriers occupied by one of the M2 control channel elements in frequency domain is equal to a first SCS, and the first SCS is used to determine a time length of a multicarrier symbol comprised by the first time window, and the combination employed by the serving cell(s) comprised by the first scheduling cell subset is used to determine a number of multicarrier symbols comprised by the first time window; M1 is no greater than a first threshold, M2 is no greater than a second threshold, and both the first threshold and the second threshold are positive integers; a number of serving cell(s) comprised by the first scheduled cell subset and a number of serving cells comprised by the scheduled cell set are jointly used to determine the first threshold and the second threshold.

In one embodiment, the second communication device 410 comprises a memory that stores a computer readable instruction program. The computer readable instruction program generates actions when executed by at least one processor. The actions include: transmitting a first information block and receiving a second information block, the first information block being used to indicate a scheduled cell set, the scheduled cell set comprising more than one serving cell, the scheduled cell set comprises a first scheduled cell subset, the first scheduled cell subset comprising a positive integer number of serving cell(s), and any serving cell comprised by the first scheduled cell subset belonging to the scheduled cell set; determines M1 control channel candidates in a first time window, the M1 control channel candidates occupying M2 control channel elements, M1 being a positive integer greater than 1, and M2 being a positive integer greater than 1, and the first time window comprising a positive integer number of time-domain consecutive multicarrier symbols; herein, a first scheduling cell subset comprises scheduling cell(s) of serving cell(s) comprised by the first scheduled cell subset, and the M1 control channel candidates are monitored in serving cell(s) comprised by the first scheduling cell subset, the first scheduling cell subset comprising a positive integer number of serving cell(s); the second information block is used to indicate a combination employed by the serving cell(s) comprised by the first scheduling cell subset, and the combination employed by the serving cell(s) comprised by the first scheduling cell subset comprises two positive integers; a subcarrier spacing (SCS) of subcarriers occupied by one of the M2 control channel elements in frequency domain is equal to a first SCS, and the first SCS is used to determine a time length of a multicarrier symbol comprised by the first time window, and the combination employed by the serving cell(s) comprised by the first scheduling cell subset is used to determine a number of multicarrier symbols comprised by the first time window; M1 is no greater than a first threshold, M2 is no greater than a second threshold, and both the first threshold and the second threshold are positive integers; a number of serving cell(s) comprised by the first scheduled cell subset and a number of serving cells comprised by the scheduled cell set are jointly used to determine the first threshold and the second threshold.

In one embodiment, the first node 450 is a UE.

In one embodiment, the first node 450 is a UE supporting multicarrier transmission.

In one embodiment, the first node 450 is a UE supporting span-based PDCCH monitoring.

In one embodiment, the second node 410 is a base station (gNB/eNB).

In one embodiment, the second node 410 is a base station supporting multicarrier transmission.

In one embodiment, the second node 410 is a base station supporting span-based PDCCH transmission.

In one embodiment, the receiver 456 (comprising the antenna 460), the receiving processor 452 and the controller/processor 490 are used for receiving the first information block in the present disclosure.

In one embodiment, the receiver 456 (comprising the antenna 460) and the receiving processor 452 are used for monitoring the M1 control channel candidates in the present disclosure.

In one embodiment, the transmitter 456 (comprising the antenna 460), the transmitting processor 455 and the controller/processor 490 are used for transmitting the second information block in the present disclosure.

In one embodiment, the transmitter 456 (comprising the antenna 460), the transmitting processor 455 and the controller/processor 490 are used for transmitting the third information block in the present disclosure.

In one embodiment, the receiver 456 (comprising the antenna 460), the receiving processor 452 and the controller/processor 490 are used for receiving the fourth information block in the present disclosure.

In one embodiment, the receiver 456 (comprising the antenna 460), the receiving processor 452 and the controller/processor 490 are used for receiving the fifth information block in the present disclosure.

In one embodiment, the transmitter 416 (comprising the antenna 420), the transmitting processor 415 and the controller/processor 440 are used for transmitting the first information block in the present disclosure.

In one embodiment, the transmitter 416 (comprising the antenna 420) and the transmitting processor 415 are used for determining the M1 control channel candidates in the present disclosure.

In one embodiment, the receiver 416 (comprising the antenna 420), the receiving processor 412 and the controller/processor 440 are used for receiving the second information block in the present disclosure.

In one embodiment, the receiver 416 (comprising the antenna 420), the receiving processor 412 and the controller/processor 440 are used for receiving the third information block in the present disclosure.

In one embodiment, the transmitter 416 (comprising the antenna 420), the transmitting processor 415 and the controller/processor 440 are used for transmitting the fourth information block in the present disclosure.

In one embodiment, the transmitter 416 (comprising the antenna 420), the transmitting processor 415 and the controller/processor 440 are used for transmitting the fifth information block in the present disclosure.

Embodiment 5

Figure 5:
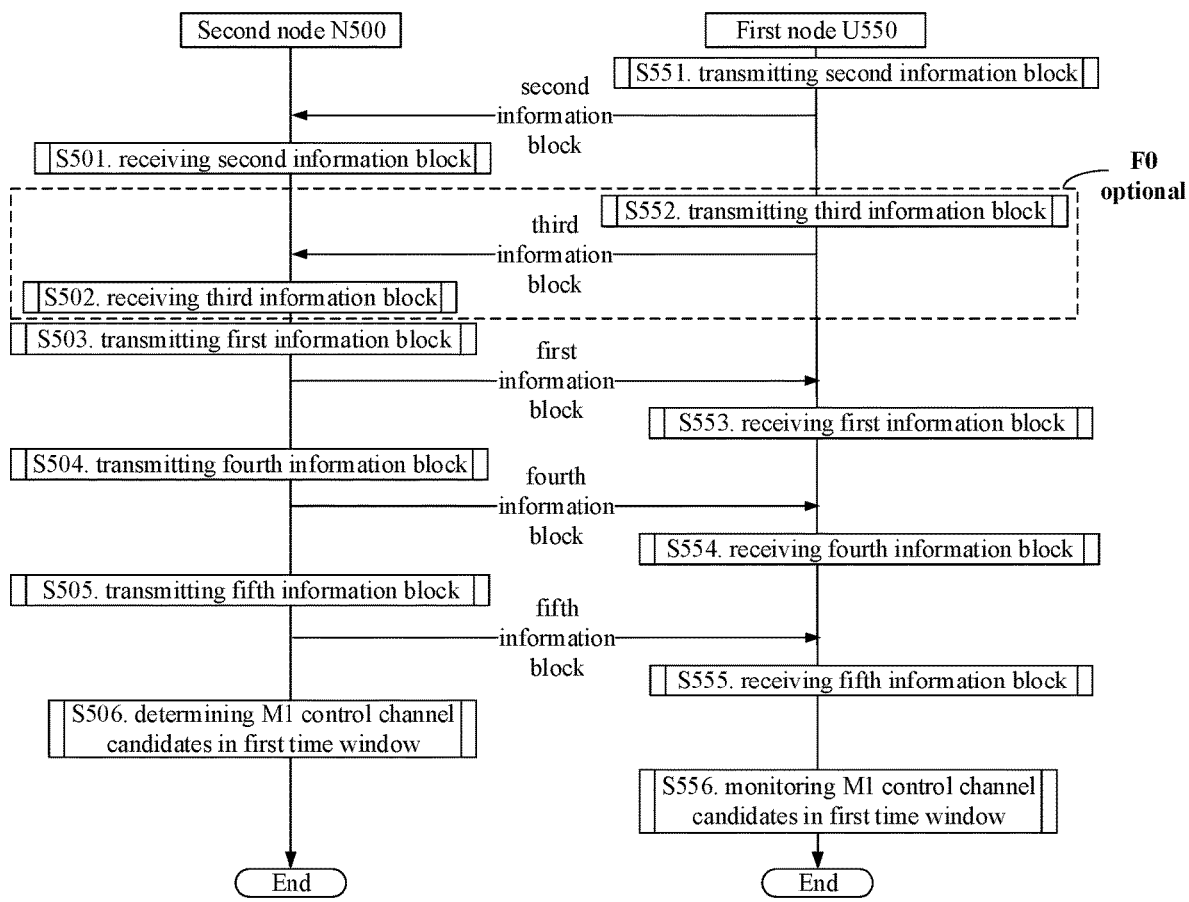
FIG. 5 illustrates a flowchart of radio signal transmission according to one embodiment of the present disclosure.

Embodiment 5 illustrates a flowchart of radio signal transmission according to one embodiment of the present disclosure, as shown in FIG. 5. In FIG. 5, a second node N500 is a maintenance base station for a serving cell of a first node U550. Steps marked by the dotted-line framed box are optional. It should be particularly noted that the order of steps illustrated herein does not restrict the practical sequential order of signal transmissions or implementations in present disclosure.

The second node N500 receives a second information block in step S501, receives a third information block in step S502, and transmits a first information block in step S503, transmits a fourth information block in step S504, transmits a fifth information block in step S505, and determines M1 control channel candidates in a first time window in step S506.

The first node U550 transmits a second information block in step S551, transmits a third information block in step S552, and receives a first information block in step S553, receives a fourth information block in step S554, receives a fifth information block in step S555, and monitors M1 control channel candidates in a first time window in step S556.

In Embodiment 5, the first information block in the present disclosure is used to determine a scheduled cell set, the scheduled cell set comprising more than one serving cell, the scheduled cell set comprises a first scheduled cell subset, the first scheduled cell subset comprising a positive integer number of serving cell(s), and any serving cell comprised by the first scheduled cell subset belonging to the scheduled cell set; the M1 control channel candidates in the present disclosure occupy M2 control channel elements, M1 being a positive integer greater than 1, and M2 being a positive integer greater than 1, and the first time window comprising a positive integer number of time-domain consecutive multicarrier symbols; a first scheduling cell subset comprises scheduling cell(s) of serving cell(s) comprised by the first scheduled cell subset, and the M1 control channel candidates are monitored in serving cell(s) comprised by the first scheduling cell subset, the first scheduling cell subset comprising a positive integer number of serving cell(s); the second information block is used to indicate a combination employed by the serving cell(s) comprised by the first scheduling cell subset, and the combination employed by the serving cell(s) comprised by the first scheduling cell subset comprises two positive integers; a subcarrier spacing (SCS) of subcarriers occupied by one of the M2 control channel elements in frequency domain is equal to a first SCS, and the first SCS is used to determine a time length of a multicarrier symbol comprised by the first time window, and the combination employed by the serving cell(s) comprised by the first scheduling cell subset is used to determine a number of multicarrier symbols comprised by the first time window; M1 is no greater than a first threshold, M2 is no greater than a second threshold, and both the first threshold and the second threshold are positive integers; a number of serving cell(s) comprised by the first scheduled cell subset and a number of serving cells comprised by the scheduled cell set are jointly used to determine the first threshold and the second threshold; the third information block in the present disclosure is used to indicate the second parameter; the fourth information block in the present disclosure is used to determine M3 control resource sets; the fifth information block in the present disclosure is used to determine the M1 control channel candidates.

In one embodiment, the fourth information block is transmitted via an air interface.

In one embodiment, the fourth information block is transmitted via a wireless interface.

In one embodiment, the fourth information block comprises all or part of a higher layer signaling.

In one embodiment, the fourth information block comprises all or part of a physical layer signaling.

In one embodiment, the fourth information block comprises all or part of an RRC signaling.

In one embodiment, the fourth information block comprises all or part of a Medium Access Control (MAC) layer signaling.

In one embodiment, the fourth information block comprises all or part of a System Information Block (SIB).

In one embodiment, the fourth information block is transmitted through a Downlink Shared Channel (DL-SCH).

In one embodiment, the fourth information block is transmitted through a Physical Downlink Shared Channel (PDSCH).

In one embodiment, the fourth information block is Cell Specific.

In one embodiment, the fourth information block is UE-specific.

In one embodiment, the fourth information block is configured Per Serving Cell.

In one embodiment, the fourth information block comprises all or part of fields of a DCI signaling.

In one embodiment, the phrase that "the fourth information block is used to determine M3 control resource sets" includes a meaning that the fourth information block is used by the first node in the present disclosure for determining the M3 control resource sets.

In one embodiment, the phrase that "the fourth information block is used to determine M3 control resource sets" includes a meaning that the fourth information block is used for explicitly indicating the M3 control resource sets.

In one embodiment, the phrase that "the fourth information block is used to determine M3 control resource sets" includes a meaning that the fourth information block is used for implicitly indicating the M3 control resource sets.

In one embodiment, the fourth information block comprises more than one sub-information-block, and each sub-information-block comprised in the fourth information block is an Information Element (IE) or a field in an RRC signaling to which the fourth information block belongs; a sub-information-block comprised in the fourth information block is used to indicate one of the M3 control resource sets.

In one embodiment, the fourth information block comprises all or part of fields of an IE "PDCCH-Config" in an RRC signaling.

In one embodiment, the fourth information block comprises all or part of fields of an IE "ControlResourceSet" in an IE "PDCCH-Config" in an RRC signaling.

In one embodiment, the fourth information block comprises a field "frequencyDomainResources" of an IE "ControlResourceSet" in an RRC signaling.

In one embodiment, the fourth information block comprises a field "duration" of an IE "ControlResourceSet" in an RRC signaling.

In one embodiment, the fourth information block comprises a field "cce-REG-MappingType" of an IE "ControlResourceSet" in an RRC signaling.

In one embodiment, the fourth information block and the first information block in the present disclosure are respectively carried by two different RRC signalings.

In one embodiment, the fourth information block and the first information block in the present disclosure are respectively carried by two different IEs in a same RRC signaling.

In one embodiment, the fourth information block and the first information block in the present disclosure are respectively carried by two different fields of a same IE in a same RRC signaling.

In one embodiment, the fourth information block is used to determine numbers of multicarrier symbols respectively occupied by the M3 control resource sets in time domain.

In one embodiment, the fifth information block is transmitted via an air interface.

In one embodiment, the fifth information block is transmitted via a wireless interface.

In one embodiment, the fifth information block comprises all or part of a higher layer signaling.

In one embodiment, the fifth information block comprises all or part of a physical layer signaling.

In one embodiment, the fifth information block comprises all or part of an RRC signaling.

In one embodiment, the fifth information block comprises all or part of a MAC layer signaling.

In one embodiment, the fifth information block comprises all or part of a SIB.

In one embodiment, the fifth information block is transmitted through a DL-SCH.

In one embodiment, the fifth information block is transmitted through a PDSCH.

In one embodiment, the fifth information block is Cell Specific.

In one embodiment, the fifth information block is UE-specific.

In one embodiment, the fifth information block is configured Per Serving Cell.

In one embodiment, the fifth information block comprises all or part of fields of a DCI signaling.

In one embodiment, the fifth information block and the first information block in the present disclosure are respectively carried by two different RRC signalings.

In one embodiment, the fifth information block and the first information block in the present disclosure are respectively carried by two different IEs in a same RRC signaling.

In one embodiment, the fifth information block and the first information block in the present disclosure are respectively carried by two different fields of a same IE in a same RRC signaling.

In one embodiment, the fifth information block and the fourth information block in the present disclosure are respectively carried by two different RRC signalings.

In one embodiment, the fifth information block and the fourth information block in the present disclosure are respectively carried by two different IEs in a same RRC signaling.

In one embodiment, the fifth information block and the fourth information block in the present disclosure are respectively carried by two different fields of a same IE in a same RRC signaling.

In one embodiment, the fifth information block comprises all or part of fields of an IE "SearchSpace" in an RRC signaling.

In one embodiment, the fifth information block comprises all or part of fields of an IE "PDCCH-Config" in an RRC signaling.

In one embodiment, the phrase that "the fifth information block is used to determine the M1 control channel candidates" includes a meaning that the fifth information block is used to determine N1 control channel candidates, and any of the M1 control channel candidates is a control channel candidate of the N1 control channel candidates, N1 being a positive integer greater than M1; M1 is equal to the first threshold, and the first threshold is used for determining the M1 control channel candidates out of the N1 control channel candidates.

In one embodiment, the phrase that "the fifth information block is used to determine the M1 control channel candidates" includes a meaning that the fifth information block is used by the first node in the present disclosure for determining the M1 control channel candidates.

In one embodiment, the phrase that "the fifth information block is used to determine the M1 control channel candidates" includes a meaning that the fifth information block is used for explicitly indicating the M1 control channel candidates.

In one embodiment, the phrase that "the fifth information block is used to determine the M1 control channel candidates" includes a meaning that the fifth information block is used for implicitly indicating the M1 control channel candidates.

Embodiment 6

Figure 6:
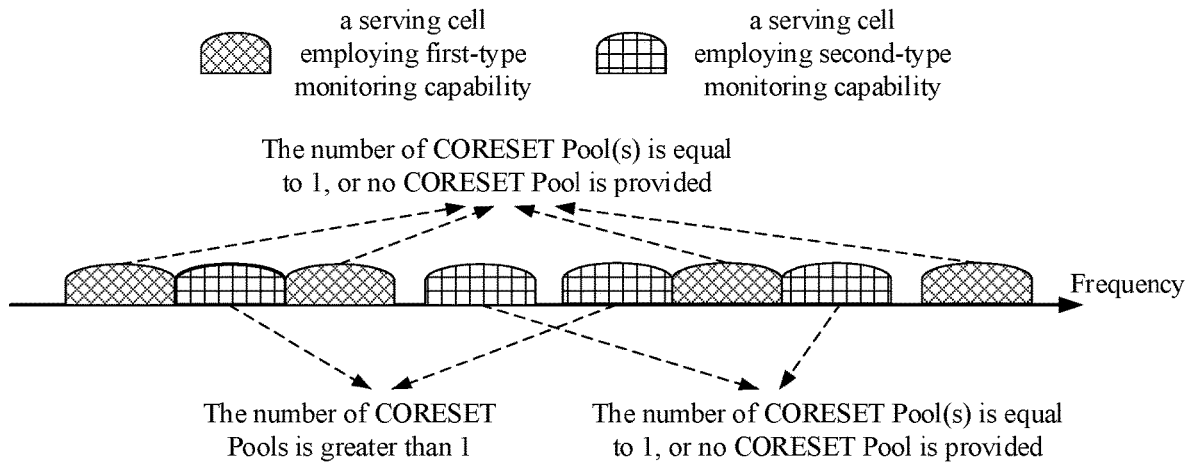
FIG. 6 illustrates a schematic diagram of relationship between a first-type monitoring capability and a number of control resource set pools according to one embodiment of the present disclosure.

Embodiment 6 illustrates a schematic diagram of relationship between a first-type monitoring capability and a number of control resource set pools according to one embodiment of the present disclosure, as shown in FIG. 6. In FIG. 6, the horizontal axis represents frequency, each cross-filled box with an arched top represents a serving cell that employs a first-type monitoring capability, and each reticle-filled box with an arched top represents a serving cell that employs a second-type monitoring capability, the second-type monitoring capability being different from the first-type monitoring capability.

In Embodiment 6, a first-type monitoring capability is employed in a scheduling cell of any serving cell comprised by the scheduled cell set, and the first information block in the present disclosure is used to indicate the first-type monitoring capability; no more than one control resource set (CORESET) pool is provided in the scheduling cell of any serving cell comprised by the scheduled cell set.

In one embodiment, the first-type monitoring capability is a PDCCH Monitoring Capability in Release 16.

In one embodiment, the first-type monitoring capability is a capability of span-based monitoring of PDCCH Candidate.

In one embodiment, the second-type monitoring capability is a PDCCH Monitoring Capability in Release 15.

In one embodiment, the second-type monitoring capability is a capability of slot-based monitoring of PDCCH Candidate.

In one embodiment, the first-type monitoring capability is a capability of monitoring of PDCCH Candidate in a time interval smaller than a slot.

In one embodiment, the first-type monitoring capability is a capability supportive of monitoring of PDCCH Candidate in Ultra-reliable and Low Latency Communications (URLLC).

In one embodiment, the first-type monitoring capability is one of two candidate monitoring capabilities, and the two candidate monitoring capabilities are respectively a PDCCH Monitoring Capability in Release 16 and a PDCCH Monitoring Capability in Release 15.

In one embodiment, the first-type monitoring capability is one of two candidate monitoring capabilities, and the two candidate monitoring capabilities are respectively a capability of span-based monitoring of PDCCH Candidate and a capability of slot-based monitoring of PDCCH Candidate.

In one embodiment, the phrase that the first information block is used to indicate the first-type monitoring capability means that the first information block is used for explicitly indicating the first-type monitoring capability.

In one embodiment, the phrase that the first information block is used to indicate the first-type monitoring capability means that the first information block is used for implicitly indicating the first-type monitoring capability.

In one embodiment, the phrase that the first information block is used to indicate the first-type monitoring capability means that the first information block is used for indirectly indicating the first-type monitoring capability.

In one embodiment, the phrase that the first information block is used to indicate the first-type monitoring capability means that the first information block is used for indicating a monitoring capability employed in a scheduling cell of each serving cell comprised by the scheduled cell set, and the monitoring capability employed in a scheduling cell of each serving cell comprised by the scheduled cell set is the first-type monitoring capability.

In one embodiment, the phrase of employing a first-type monitoring capability in a scheduling cell of any serving cell comprised by the scheduled cell set includes a meaning that the first node in the present disclosure employs the first-type monitoring capability in monitoring a PDCCH Candidate in a scheduling cell of any serving cell comprised by the scheduled cell set.

In one embodiment, the phrase of employing a first-type monitoring capability in a scheduling cell of any serving cell comprised by the scheduled cell set includes a meaning that a scheduling cell of any serving cell comprised by the scheduled cell set is configured with the first-type monitoring capability.

In one embodiment, the phrase of employing a first-type monitoring capability in a scheduling cell of any serving cell comprised by the scheduled cell set includes a meaning that a scheduling cell of any serving cell comprised by the scheduled cell set is configured with the first-type monitoring capability by the first information block.

In one embodiment, the phrase of employing a first-type monitoring capability in a scheduling cell of any serving cell comprised by the scheduled cell set includes a meaning that a scheduling cell of any serving cell comprised by the scheduled cell set corresponds to the first-type monitoring capability.

In one embodiment, the phrase of employing a first-type monitoring capability in a scheduling cell of any serving cell comprised by the scheduled cell set includes a meaning that a scheduling cell of any serving cell comprised by the scheduled cell set is associated with the first-type monitoring capability.

In one embodiment, the phrase that no more than one control resource set (CORESET) pool is provided in the scheduling cell of any serving cell comprised by the scheduled cell set includes a meaning that the first node in the present disclosure does not expect that more than one CORESET pool is provided in the scheduling cell of any serving cell comprised by the scheduled cell set.

In one embodiment, the phrase that no more than one control resource set (CORESET) pool is provided in the scheduling cell of any serving cell comprised by the scheduled cell set includes a meaning that no CORESET pool is provided in the scheduling cell of any serving cell comprised by the scheduled cell set.

In one embodiment, the phrase that no more than one control resource set (CORESET) pool is provided in the scheduling cell of any serving cell comprised by the scheduled cell set includes a meaning that only one CORESET pool is provided in the scheduling cell of any serving cell comprised by the scheduled cell set.

In one embodiment, the phrase that no more than one control resource set (CORESET) pool is provided in the scheduling cell of any serving cell comprised by the scheduled cell set includes a meaning that either 0 CORESET pool or just 1 CORESET pool is provided in the scheduling cell of any serving cell comprised by the scheduled cell set.

In one embodiment, the phrase that no more than one control resource set (CORESET) pool is provided in the scheduling cell of any serving cell comprised by the scheduled cell set includes a meaning that there isn't a serving cell in the scheduled cell set of which the scheduling cell is provided with more than one CORESET pool.

In one embodiment, the phrase that no more than one control resource set (CORESET) pool is provided in the scheduling cell of any serving cell comprised by the scheduled cell set includes a meaning that no more than one CORESET Pool Index is provided in the scheduling cell of any serving cell comprised by the scheduled cell set.

In one embodiment, the phrase that no more than one control resource set (CORESET) pool is provided in the scheduling cell of any serving cell comprised by the scheduled cell set includes a meaning that only one CORESET Pool Index or no CORESET Pool Index is provided in the scheduling cell of any serving cell comprised by the scheduled cell set.

In one embodiment, the fourth information block in the present disclosure is used to determine a number of CORESET Pool(s) in the scheduling cell of any serving cell comprised by the scheduled cell set.

In one embodiment, the first transceiver in the present disclosure receives a sixth information block, herein, the sixth information block is used to determine a number of CORESET Pool(s) in the scheduling cell of any serving cell comprised by the scheduled cell set.

Embodiment 7

Figure 7:
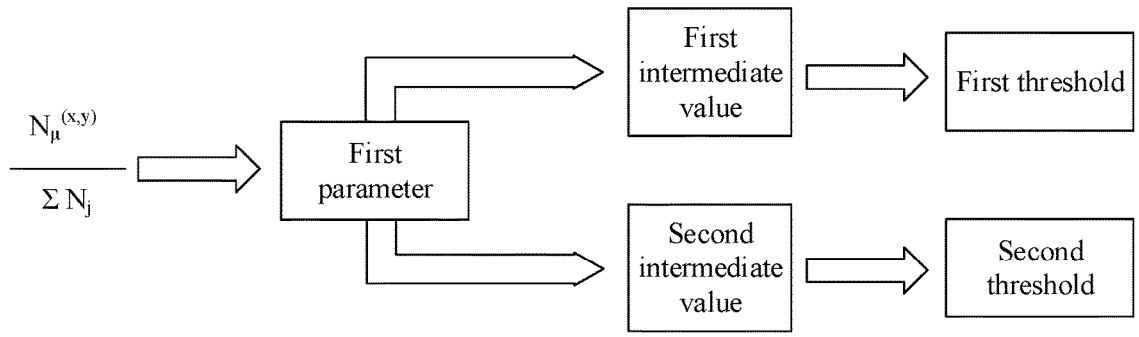
FIG. 7 illustrates a schematic diagram of how a first parameter relates to a first threshold and a second threshold according to one embodiment of the present disclosure.

Embodiment 7 illustrates a schematic diagram of how a first parameter relates to a first threshold and a second threshold according to one embodiment of the present disclosure, as shown in FIG. 7. In FIG. 7, $N_\mu^{(x,y)}$ represents a number of serving cell(s) comprised by a first scheduled cell subset; $N_j$ represents a number of serving cell(s) comprised by a scheduled cell set being associated with at least one control channel candidate that employ an SCS index j; $\Sigma N_j$ represents a number of serving cell(s) comprised by a scheduled cell set being associated with at least one control channel candidate; $\mu$ represents a first SCS; (x, y) represents a combination employed by serving cell(s) comprised by a first scheduling cell subset.

In Embodiment 7, a ratio of the number of serving cell(s) comprised by the first scheduled cell subset in the present disclosure to a number of serving cell(s) comprised by the scheduled cell set being associated with at least one control channel candidate in the present disclosure is used to determine a first parameter; the first threshold in the present disclosure is equal to a maximum integer no greater than a first intermediate value, and the first intermediate value is proportional to the first parameter; the second threshold in the present disclosure is equal to a maximum integer no greater than a second intermediate value, and the second intermediate value is proportional to the first parameter.

In one embodiment, the phrase that "a number of serving cell(s) comprised by the scheduled cell set being associated with at least one control channel candidate" refers to a number of serving cell(s) comprised by the scheduled cell set.

In one embodiment, the phrase that "a number of serving cell(s) comprised by the scheduled cell set being associated with at least one control channel candidate" refers to a number of serving cell(s) comprised by the scheduled cell set being associated with at least one control channel candidate in the first time window.

In one embodiment, any serving cell comprised by a second scheduled cell subset belongs to the scheduled cell set, and there is at least one candidate control candidate being associated with any serving cell comprised by the second scheduled cell subset in the first time window, and the phrase that "a number of serving cell(s) comprised by the scheduled cell set being associated with at least one control channel candidate" refers to the number of serving cell(s) comprised by the second scheduled cell subset.

In one embodiment, any serving cell comprised by a second scheduled cell subset belongs to the scheduled cell set, and there is at least one candidate control candidate corresponding to any serving cell comprised by the second scheduled cell subset in the first time window, and the phrase that "a number of serving cell(s) comprised by the scheduled cell set being associated with at least one control channel candidate" refers to the number of serving cell(s) comprised by the second scheduled cell subset.

In one embodiment, any serving cell comprised by a second scheduled cell subset belongs to the scheduled cell set, and any serving cell comprised by the second scheduled cell subset can be scheduled by a control channel carried by one control channel candidate in the first time window, and the phrase that "a number of serving cell(s) comprised by the scheduled cell set being associated with at least one control channel candidate" refers to the number of serving cell(s) comprised by the second scheduled cell subset.

In one embodiment, the number of serving cell(s) comprised by the scheduled cell set being associated with at least one control channel candidate is equal to the number of serving cell(s) comprised by the scheduled cell set.

In one embodiment, the number of serving cell(s) comprised by the scheduled cell set being associated with at least one control channel candidate is less than the number of serving cell(s) comprised by the scheduled cell set.

In one embodiment, the number of serving cell(s) comprised by the scheduled cell set being associated with at least one control channel candidate is related to configurations of a Search Space Set (SS Set).

In one embodiment, the number of serving cell(s) comprised by the scheduled cell set and the configurations of an SS Set are used together for determining the number of serving cell(s) comprised by the scheduled cell set being associated with at least one control channel candidate.

In one embodiment, the number of serving cell(s) comprised by the scheduled cell set and the configurations of SS Set(s) of scheduling cell(s) of the serving cell(s) comprised by the scheduled cell set are used together for determining the number of serving cell(s) comprised by the scheduled cell set being associated with at least one control channel candidate.

In one embodiment, the phrase that "a ratio of the number of serving cell(s) comprised by the first scheduled cell subset to a number of serving cell(s) comprised by the scheduled cell set being associated with at least one control channel candidate is used to determine a first parameter" means that: the first parameter is equal to the ratio of the number of serving cell(s) comprised by the first scheduled cell subset to a number of serving cell(s) comprised by the scheduled cell set being associated with at least one control channel candidate.

In one embodiment, the phrase that "a ratio of the number of serving cell(s) comprised by the first scheduled cell subset to a number of serving cell(s) comprised by the scheduled cell set being associated with at least one control channel candidate is used to determine a first parameter" means that: the first parameter is equal to the ratio of the number of serving cell(s) comprised by the first scheduled cell subset to a number of serving cell(s) comprised by the scheduled cell set being associated with at least one control channel candidate being rounded down to a nearest integer.

In one embodiment, the phrase that "a ratio of the number of serving cell(s) comprised by the first scheduled cell subset to a number of serving cell(s) comprised by the scheduled cell set being associated with at least one control channel candidate is used to determine a first parameter" means that: the first parameter is equal to the ratio of the number of serving cell(s) comprised by the first scheduled cell subset to a number of serving cell(s) comprised by the scheduled cell set being associated with at least one control channel candidate being rounded up to a nearest integer.

In one embodiment, the phrase that "a ratio of the number of serving cell(s) comprised by the first scheduled cell subset to a number of serving cell(s) comprised by the scheduled cell set being associated with at least one control channel candidate is used to determine a first parameter" means that: the first parameter is linear with the ratio of the number of serving cell(s) comprised by the first scheduled cell subset to a number of serving cell(s) comprised by the scheduled cell set being associated with at least one control channel candidate.

In one embodiment, the phrase that "a ratio of the number of serving cell(s) comprised by the first scheduled cell subset to a number of serving cell(s) comprised by the scheduled cell set being associated with at least one control channel candidate is used to determine a first parameter" means that: the ratio of the number of serving cell(s) comprised by the first scheduled cell subset to a number of serving cell(s) comprised by the scheduled cell set being associated with at least one control channel candidate is used by the first node in the present disclosure for determining the first parameter.

In one embodiment, the phrase that "a ratio of the number of serving cell(s) comprised by the first scheduled cell subset to a number of serving cell(s) comprised by the scheduled cell set being associated with at least one control channel candidate is used to determine a first parameter" means that: the ratio of the number of serving cell(s) comprised by the first scheduled cell subset to a number of serving cell(s) comprised by the scheduled cell set being associated with at least one control channel candidate is used for determining the first parameter according to an operation function.

In one embodiment, the first threshold is obtained by rounding the first intermediate value down to a nearest integer.

In one embodiment, the second threshold is obtained by rounding the second intermediate value down to a nearest integer.

In one embodiment, the first intermediate value is a positive integer.

In one embodiment, the first intermediate value is a non-integer.

In one embodiment, the second intermediate value is a positive integer.

In one embodiment, the second intermediate value is a non-integer.

In one embodiment, a scaling factor between the first intermediate value and the second intermediate value is a fixed value.

In one embodiment, a scaling factor between the first intermediate value and the second intermediate value is a configurable value.

In one embodiment, a scaling factor between the first intermediate value and the second intermediate value is predefined.

In one embodiment, a scaling factor between the first intermediate value and the second intermediate value is equal to a product of the second parameter and the third parameter in the present disclosure.

In one embodiment, a scaling factor between the first intermediate value and the second intermediate value is related to the first SCS.

In one embodiment, a scaling factor between the second intermediate value and the first parameter is a fixed value.

In one embodiment, a scaling factor between the second intermediate value and the first parameter is a configurable value.

In one embodiment, a scaling factor between the second intermediate value and the first parameter is predefined.

In one embodiment, a scaling factor between the second intermediate value and the first parameter is equal to a product of the second parameter and the fourth parameter in the present disclosure.

In one embodiment, a scaling factor between the second intermediate value and the first parameter is related to the first SCS.

Embodiment 8

Figure 8:
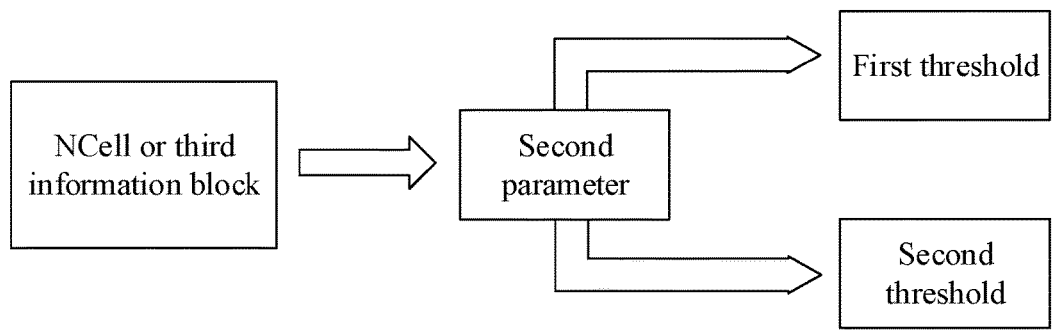
FIG. 8 illustrates a schematic diagram of a second parameter according to one embodiment of the present disclosure.

Embodiment 8 illustrates a schematic diagram of a second parameter according to one embodiment of the present disclosure, as shown in FIG. 8. In FIG. 8, $N_{cell}$ represents a number of serving cell(s) comprised by a scheduled cell set.

In Embodiment 8, a second parameter is used to determine the first threshold and the second threshold in the present disclosure, the second parameter being a positive integer; the second parameter is equal to the number of serving cells comprised by the scheduled cell set in the present disclosure; or a third information block is transmitted; the third information block is used to indicate the second parameter.

In one embodiment, the second parameter is either equal to the number of serving cell(s) comprised by the scheduled cell set or equal to a value indicated by the third information block.

In one embodiment, the second parameter is equal to 1.

In one embodiment, the second parameter is a positive integer greater than 1.

In one embodiment, the phrase that a second parameter is used to determine the first threshold and the second threshold includes a meaning that the second parameter is used by the first node in the present disclosure for determining the first threshold and the second threshold.

In one embodiment, the phrase that a second parameter is used to determine the first threshold and the second threshold includes a meaning that the first threshold is proportional to the second parameter, and the second threshold is proportional to the second parameter.

In one embodiment, the phrase that a second parameter is used to determine the first threshold and the second threshold includes a meaning that the first threshold is linearly correlated to the second parameter, and the second threshold is linearly correlated to the second parameter.

In one embodiment, the phrase that a second parameter is used to determine the first threshold and the second threshold includes a meaning that the second parameter is used for determining the first threshold and the second threshold according to an operational function.

In one embodiment, the phrase that a second parameter is used to determine the first threshold and the second threshold includes a meaning that the first intermediate value in the present disclosure is proportional to the second parameter, and the second intermediate value in the present disclosure is proportional to the second parameter.

In one embodiment, the phrase that a second parameter is used to determine the first threshold and the second threshold includes a meaning that the first intermediate value in the present disclosure is proportional to the second parameter, and a scaling factor between the first intermediate value and the second parameter in the present disclosure is equal to a product of the first parameter and the third parameter in the present disclosure, while the second intermediate value in the present disclosure is proportional to the second parameter, and a scaling factor between the second intermediate value and the second parameter in the present disclosure is equal to a product of the first parameter and the fourth parameter in the present disclosure.

In one embodiment, the phrase that a second parameter is used to determine the first threshold and the second threshold is realized by the following formulas:

$$M_{PDCCH}^{total,slot,\mu} = \lfloor N_{cells}^{cap} \cdot M_{PDCCH}^{max,slot,\mu} \cdot P_{cells}^{DL,\mu} \rfloor$$

$$C_{PDCCH}^{total,slot,\mu} = \lfloor N_{cells}^{cap} \cdot C_{PDCCH}^{max,slot,\mu} \cdot P_{cells}^{DL,\mu} \rfloor$$

Herein, $M_{PDCCH}^{total, slot, \mu}$ represents the first threshold, $C_{PDCCH}^{total, slot, \mu}$ represents the second threshold; $P_{cells}^{DL,\mu}$ represents the first parameter in the present disclosure, $N_{cells}^{cap}$ represents the second parameter in the present disclosure, $M_{PDCCH}^{max, slot, \mu}$ represents the third parameter in the present disclosure, and $C_{PDCCH}^{max, slot, \mu}$ represents the fourth parameter in the present disclosure, $\mu$ represents an index of the first SCS.

In one embodiment, the first parameter and the second parameter are associated.

In one embodiment, the first parameter and the second parameter are unrelated.

In one embodiment, the first parameter and the second parameter are independent of each other.

In one embodiment, the third information block is transmitted via an air interface.

In one embodiment, the third information block is transmitted via a wireless interface.

In one embodiment, the third information block comprises all or part of a higher layer signaling.

In one embodiment, the third information block comprises all or part of a physical layer signaling.

In one embodiment, the third information block comprises all or part of an RRC signaling.

In one embodiment, the third information block comprises all or part of a MAC layer signaling.

In one embodiment, the third information block is transmitted through an UL-SCH.

In one embodiment, the third information block is transmitted through a PUSCH.

In one embodiment, the third information block is UE-specific.

In one embodiment, the third information block is used for indicating a capability of the first node in the present disclosure.

In one embodiment, the third information block is used for indicating a CA or DC capability of the first node in the present disclosure.

In one embodiment, the third information block is used for indicating a blind detection capability of the first node in the present disclosure.

In one embodiment, the third information block comprises an IE "Phy-Parameters".

In one embodiment, the third information block comprises a field "pdcch-BlindDetectionCA-r16" of an IE "Phy-Parameters".

In one embodiment, the third information block comprises a field "pdcch-BlindDetectionCA-r15" of an IE "Phy-Parameters".

In one embodiment, the third information block comprises a field "pdcch-BlindDetectionCA-r17" of an IE "Phy-Parameters".

In one embodiment, the third information block comprises a field "pdcch-BlindDetectionCA" of an IE "Phy-Parameters".

In one embodiment, the third information block comprises a field "pdcch-BlindDetectionNRDC" of an IE "Phy-Parameters".

In one embodiment, the third information block comprises a field "pdcch-BlindDetectionMCG-UE" of an IE "Phy-Parameters".

In one embodiment, the third information block comprises a field "pdcch-BlindDetectionSCG-UE" of an IE "Phy-Parameters".

In one embodiment, the third information block and the second information block in the present disclosure are carried by two different RRC signalings.

In one embodiment, the third information block and the second information block in the present disclosure are carried by two different IEs in a same RRC signaling.

In one embodiment, the third information block and the second information block in the present disclosure are carried by two different fields of a same IE in a same RRC signaling.

In one embodiment, the phrase that the third information block is used to indicate the second parameter means that the third information block is used by the first node in the present disclosure for indicating the second parameter.

In one embodiment, the phrase that the third information block is used to indicate the second parameter means that the third information block is used for explicitly indicating the second parameter.

In one embodiment, the phrase that the third information block is used to indicate the second parameter means that the third information block is used for implicitly indicating the second parameter.

Embodiment 9

Figures 9, 10:
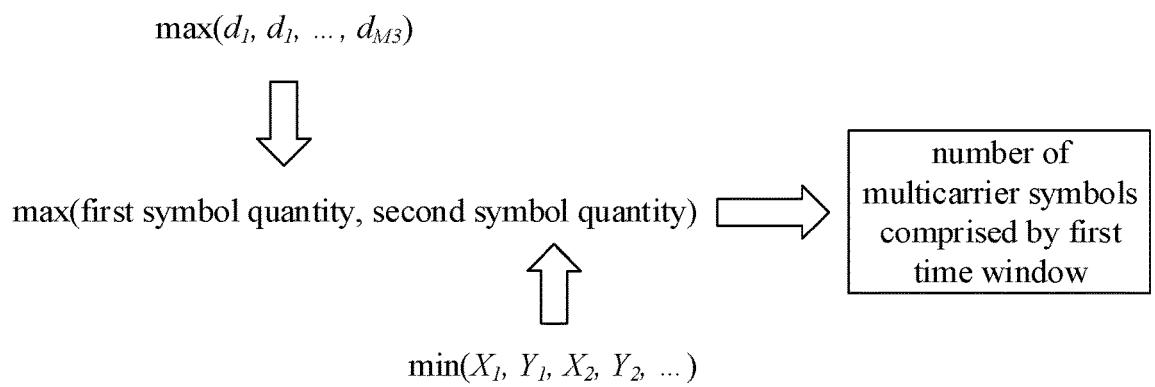
FIG. 9 illustrates a schematic diagram of how a third parameter and a fourth parameter relate to a first SCS according to one embodiment of the present disclosure.
FIG. 10 illustrates a schematic diagram of how a first time window relates to a first symbol quantity and a second symbol quantity according to one embodiment of the present disclosure.

Embodiment 9 illustrates a schematic diagram of how a third parameter and a fourth parameter relate to a first SCS according to one embodiment of the present disclosure, as shown in FIG. 9. In FIG. 9, the first column from the left represents indexes for scheduling SCSs, the second column from the left represents X first-type candidate parameters, and the third column from the left represents X second-type candidate parameters, the SCS index in bold is an index of a first SCS, the first-type candidate parameter in bold is a third parameter, and the second-type candidate parameter in bold is a fourth parameter.

In Embodiment 9, the first SCS in the present disclosure is one of X candidate SCSs, X being a positive integer greater than 1; the X candidate SCSs respectively correspond to X first-type candidate parameters, and any of the X first-type candidate parameters is a positive integer, the X candidate SCSs respectively correspond to X second-type candidate parameters, and any of the X second-type candidate parameters is a positive integer; a third parameter is one of the X first-type candidate parameters, and the third parameter is used to determine the first threshold in the present disclosure; a fourth parameter is one of the X second-type candidate parameters, and the fourth parameter is used to determine the second threshold in the present disclosure; the first SCS is used to determine the third parameter out of the X first-type candidate parameters, and the first SCS is used to determine the fourth parameter out of the X second-type candidate parameters.

In one embodiment, any of the X candidate SCSs is equal to one of 15 kHz, 30 kHz, 60 kHz or 120 kHz.

In one embodiment, any of the X candidate SCSs is equal to one of 15 kHz, 30 kHz, 60 kHz, 120 kHz or 240 kHz.

In one embodiment, any of the X candidate SCSs is equal to a non-negative integral power of 2 of 15 kHz.

In one embodiment, X is equal to 4.

In one embodiment, X is greater than 4.

In one embodiment, X is no less than 4.

In one embodiment, the X candidate SCSs are predefined.

In one embodiment, the X candidate SCSs are fixed.

In one embodiment, the X candidate SCSs are composed of all SCSs supported by R17.

In one embodiment, the X candidate SCSs are composed of all SCSs supported by R16.

In one embodiment, any two of the X candidate SCSs are unequal.

In one embodiment, any of the X first-type candidate parameters is a maximum number of PDCCH Candidates monitored in a slot on a serving cell.

In one embodiment, any two of the X first-type candidate parameters are unequal.

In one embodiment, among the X first-type candidate parameters there are two first-type candidate parameters being equal.

In one embodiment, X is equal to 4, and the X first-type candidate parameters are 44, 36, 22 and 20, respectively.

In one embodiment, any of the X first-type candidate parameters is a possible value of $M_{PDCCH}^{max,slot,\mu}$.

In one embodiment, the X first-type candidate parameters are predefined.

In one embodiment, any of the X second-type candidate parameters is a maximum number of Non-Overlapped CCEs monitored in a slot on a serving cell.

In one embodiment, any two of the X second-type candidate parameters are unequal.

In one embodiment, among the X second-type candidate parameters there are two second-type candidate parameters being equal.

In one embodiment, X is equal to 4, and the X second-type candidate parameters are 56, 56, 48 and 32, respectively.

In one embodiment, any of the X second-type candidate parameters is a possible value of $C_{PDCCH}^{max,slot,\mu}$.

In one embodiment, the X second-type candidate parameters are predefined.

In one embodiment, the X first-type candidate parameters and the X second-type candidate parameters are independent.

In one embodiment, the phrase that "the X candidate SCSs respectively correspond to X first-type candidate parameters" includes a meaning that the X candidate SCSs respectively correspond to X first-type candidate parameters according to a table relationship.

In one embodiment, the phrase that "the X candidate SCSs respectively correspond to X first-type candidate parameters" includes a meaning that the X candidate SCSs respectively correspond to X first-type candidate parameters according to a mapping relationship.

In one embodiment, the phrase that "the X candidate SCSs respectively correspond to X second-type candidate parameters" includes a meaning that the X candidate SCSs respectively correspond to X second-type candidate parameters according to a table relationship.

In one embodiment, the phrase that "the X candidate SCSs respectively correspond to X second-type candidate parameters" includes a meaning that the X candidate SCSs respectively correspond to X second-type candidate parameters according to a mapping relationship.

In one embodiment, the phrase that "the third parameter is used to determine the first threshold" includes a meaning that the third parameter is used by the first node in the present disclosure for determining the first threshold.

In one embodiment, the phrase that "the third parameter is used to determine the first threshold" includes a meaning that the first threshold is proportional to the third parameter.

In one embodiment, the phrase that "the third parameter is used to determine the first threshold" includes a meaning that the first threshold is proportional to the third parameter, and a scaling factor between the first threshold and the third parameter is equal to a product of the first parameter and the second parameter in the present disclosure.

In one embodiment, the phrase that "the third parameter is used to determine the first threshold" includes a meaning that the first threshold is equal to a maximum integer no greater than a first transition threshold, and the first transition threshold is proportional to the third parameter.

In one embodiment, the phrase that "the third parameter is used to determine the first threshold" includes a meaning that the first threshold is equal to a maximum integer no greater than a first transition threshold, and the first transition threshold is proportional to the third parameter, and a scaling factor between the first transition threshold and the third parameter is equal to a product of the first parameter and the second parameter in the present disclosure.

In one embodiment, the phrase that "the third parameter is used to determine the first threshold" is realized by the following formula:

$$M_{PDCCH}^{total,slot,\mu} = \lfloor N_{cells}^{cap} \cdot M_{PDCCH}^{max,slot,\mu} \cdot P_{cells}^{DL,\mu} \rfloor$$

$M_{PDCCH}^{total,slot,\mu}$ represents the first threshold, $P_{cells}^{DL,\mu}$ represents the first parameter in the present disclosure, $N_{cells}^{cap}$ represents the second parameter in the present disclosure, $M_{PDCCH}^{max,slot,\mu}$ represents the third parameter, and $\mu$ represents an index of the first SCS.

In one embodiment, the phrase that "the fourth parameter is used to determine the second threshold" includes a meaning that the fourth parameter is used by the first node in the present disclosure for determining the second threshold.

In one embodiment, the phrase that "the fourth parameter is used to determine the second threshold" includes a meaning that the second threshold is proportional to the fourth parameter.

In one embodiment, the phrase that "the fourth parameter is used to determine the second threshold" includes a meaning that the second threshold is proportional to the fourth parameter, and a scaling factor between the second threshold and the fourth parameter is equal to a product of the first parameter and the second parameter in the present disclosure.

In one embodiment, the phrase that "the fourth parameter is used to determine the second threshold" includes a meaning that the second threshold is equal to a maximum integer no greater than a second transition threshold, and the second transition threshold is proportional to the fourth parameter.

In one embodiment, the phrase that "the fourth parameter is used to determine the second threshold" includes a meaning that the second threshold is equal to a maximum integer no greater than a second transition threshold, and the second transition threshold is proportional to the fourth parameter, and a scaling factor between the second transition threshold and the fourth parameter is equal to a product of the first parameter and the second parameter in the present disclosure.

In one embodiment, the phrase that "the fourth parameter is used to determine the second threshold" is realized by the following formula:

$$C_{PDCCH}^{total,slot,\mu} = \lfloor N_{cells}^{cap} \cdot C_{PDCCH}^{max,slot,\mu} \cdot P_{cells}^{DL,\mu} \rfloor$$

$C_{PDCCH}^{total,slot,\mu}$ represents the second threshold, $P_{cells}^{DL,\mu}$ represents the first parameter in the present disclosure, $N_{cell}^{cap}$ represents the second parameter in the present disclosure, $C_{PDCCH}^{max,slot,\mu}$ represents the fourth parameter, and $\mu$ represents an index of the first SCS.

In one embodiment, the phrase that "the first SCS is used to determine the third parameter out of the X first-type candidate parameters" includes a meaning that the first SCS is used by the first node in the present disclosure for determining the third parameter out of the X first-type candidate parameters.

In one embodiment, the phrase that "the first SCS is used to determine the third parameter out of the X first-type candidate parameters" includes a meaning that the third parameter is one of the X first-type candidate parameters that corresponds to the first SCS.

In one embodiment, the phrase that "the first SCS is used to determine the third parameter out of the X first-type candidate parameters" includes a meaning that the first SCS is used for determining the third parameter out of the X first-type candidate parameters according to a given mapping relationship.

In one embodiment, the phrase that "the first SCS is used to determine the fourth parameter out of the X second-type candidate parameters" includes a meaning that the first SCS is used by the first node in the present disclosure for determining the fourth parameter out of the X second-type candidate parameters.

In one embodiment, the phrase that "the first SCS is used to determine the fourth parameter out of the X second-type candidate parameters" includes a meaning that the fourth parameter is one of the X second-type candidate parameters that corresponds to the first SCS.

In one embodiment, the phrase that "the first SCS is used to determine the fourth parameter out of the X second-type candidate parameters" includes a meaning that the first SCS is used for determining the fourth parameter out of the X second-type candidate parameters according to a given mapping relationship.

In one embodiment, for each serving cell comprised by the first scheduled cell subset in the present disclosure, it is not required that the number of control channel candidate(s) of the M1 control channel candidates monitored by the first node in the present disclosure exceed a smaller value of the first threshold and the third parameter.

In one embodiment, for each serving cell comprised by the first scheduled cell subset in the present disclosure, it is not required that the number of control channel element(s) of the M2 control channel elements comprised by the first node in the present disclosure exceed a smaller value of the second threshold and the fourth parameter.

Embodiment 10

Embodiment 10 illustrates a schematic diagram of how a first time window relates to a first symbol quantity and a second symbol quantity according to one embodiment of the present disclosure, as shown in FIG. 10. In FIG. 10, $d_1, d_1, \ldots, d_{M3}$ respectively represent numbers of multi-carrier symbols respectively occupied by M3 control resource sets in time domain, $(X_1, Y_1), (X_2, Y_2) \ldots$ represent combinations comprised in a target combination set.

In Embodiment 10, the fourth information block in the present disclosure is used to determine M3 control resource sets, M3 being a positive integer greater than 1, and a control resource set in the present disclosure to which any one of the M2 control channel elements belongs is one of the M3 control resource sets; the second information block in the present disclosure is used to indicate a target combination set, the target combination set comprising a positive integer number of combination(s), a combination employed by the serving cell(s) comprised by the first scheduling cell subset belongs to the target combination set; the number of multicarrier symbols comprised by the first time window in the present disclosure is equal to a larger value between a first symbol quantity and a second symbol quantity; the first symbol quantity is equal to a maximum value of numbers of multicarrier symbols respectively occupied by the M3 control resource sets in time domain, while the second symbol quantity is equal to a minimum value of positive integers comprised by the combination(s) in the target combination set.

In one embodiment, any Control Resource Set (CORESET) of the M3 control resource sets comprises contiguous time-domain resources and contiguous frequency-domain resources.

In one embodiment, any CORESET of the M3 control resource sets is identified by a CORESET Index.

In one embodiment, time-frequency resources respectively comprised by any two of the M3 control resource sets are orthogonal.

In one embodiment, there are two CORESETs among the M3 control resource sets comprising time-frequency resources that are non-orthogonal.

In one embodiment, there are two CORESETs among the M3 control resource sets comprising time-frequency resources that are partially overlapped or fully overlapped.

In one embodiment, any two CORESETs among the M3 control resource sets are of different indexes.

In one embodiment, the M3 control resource sets comprise N2 control channel elements, and any control channel element of the M2 control channel elements is one of the N2 control channel elements, N2 being a positive integer greater than M2; M2 is equal to the second threshold, and the second threshold is used to determine the M2 control channel elements out of the N2 control channel elements.

In one embodiment, a control resource set to which any of the M2 control channel elements belongs is one of the M3 control resource sets.

In one embodiment, any two of the M2 control channel elements belong to a same control resource set of the M3 control resource sets.

In one embodiment, there are two control channel elements of the M2 control channel elements respectively belonging to two different control resource sets of the M3 control resource sets.

In one embodiment, the phrase that "the second information block is used to indicate a combination employed by the serving cell(s) comprised by the first scheduling cell subset" means that the second information block is used to indicate the target combination set.

In one embodiment, the phrase that "the second information block is used to indicate a target combination set" includes a meaning that the second information block is used by the first node in the present disclosure for indicating the target combination set.

In one embodiment, the phrase that "the second information block is used to indicate a target combination set" includes a meaning that the second information block is used for explicitly indicating the target combination set.

In one embodiment, the phrase that "the second information block is used to indicate a target combination set" includes a meaning that the second information block is used for implicitly indicating the target combination set.

In one embodiment, the target combination set only comprises one combination.

In one embodiment, the target combination set comprises more than one combination.

In one embodiment, any combination comprised by the target combination set is one of (7, 3), (4, 3) or (2, 2).

In one embodiment, any combination comprised by the target combination set comprises two positive integers.

In one embodiment, the target combination set comprises a combination comprising two positive integers.

In one embodiment, any combination employed by any serving cell comprised by the first scheduling cell subset belongs to the target combination set.

In one embodiment, any combination employed by any serving cell comprised by the first scheduling cell subset is a second combination, the second combination belonging to the target combination set.

In one embodiment, the first symbol quantity is a positive integer.

In one embodiment, the second symbol quantity is a positive integer.

In one embodiment, the first symbol quantity is a positive integer, and the first symbol quantity represents a number of multicarrier symbols.

In one embodiment, the first symbol quantity is a positive integer, and the first symbol quantity represents a number of multicarrier symbols corresponding to the first SCS.

In one embodiment, the second symbol quantity is a positive integer, and the second symbol quantity represents a number of multicarrier symbols.

In one embodiment, the second symbol quantity is a positive integer, and the second symbol quantity represents a number of multicarrier symbols corresponding to the first SCS.

In one embodiment, the first symbol quantity is greater than the second symbol quantity.

In one embodiment, the first symbol quantity is less than the second symbol quantity.

In one embodiment, the first symbol quantity is equal to the second symbol quantity.

In one embodiment, the phrase that "the first symbol quantity is equal to a maximum value of numbers of multicarrier symbols respectively occupied by the M3 control resource sets in time domain" includes a meaning that there isn't a control resource set among the M3 control resource sets occupying multicarrier symbols in time domain of which the number is greater than the first symbol quantity.

In one embodiment, the phrase that "the first symbol quantity is equal to a maximum value of numbers of multicarrier symbols respectively occupied by the M3 control resource sets in time domain" includes a meaning that the M3 control resource sets respectively occupy M3 symbol quantities in time domain, and the first symbol quantity is equal to a maximum value of the M3 symbol quantities.

In one embodiment, the phrase that "the second symbol quantity is equal to a minimum value of positive integers comprised by the combination(s) in the target combination set" includes a meaning that there isn't a combination of combination(s) comprised in the target combination set that comprises a positive integer less than the second symbol quantity.

In one embodiment, the phrase that "the second symbol quantity is equal to a minimum value of positive integers comprised by the combination(s) in the target combination set" includes a meaning that any positive integer comprised by any combination in the target combination set is no less than the second symbol quantity.

In one embodiment, the phrase that "the second symbol quantity is equal to a minimum value of positive integers comprised by the combination(s) in the target combination set" includes a meaning that the target combination set comprises a total of R1 positive integers, and the second symbol quantity is a minimum value of the R1 positive integers, R1 being a positive integer.

Embodiment 11

Figure 11:
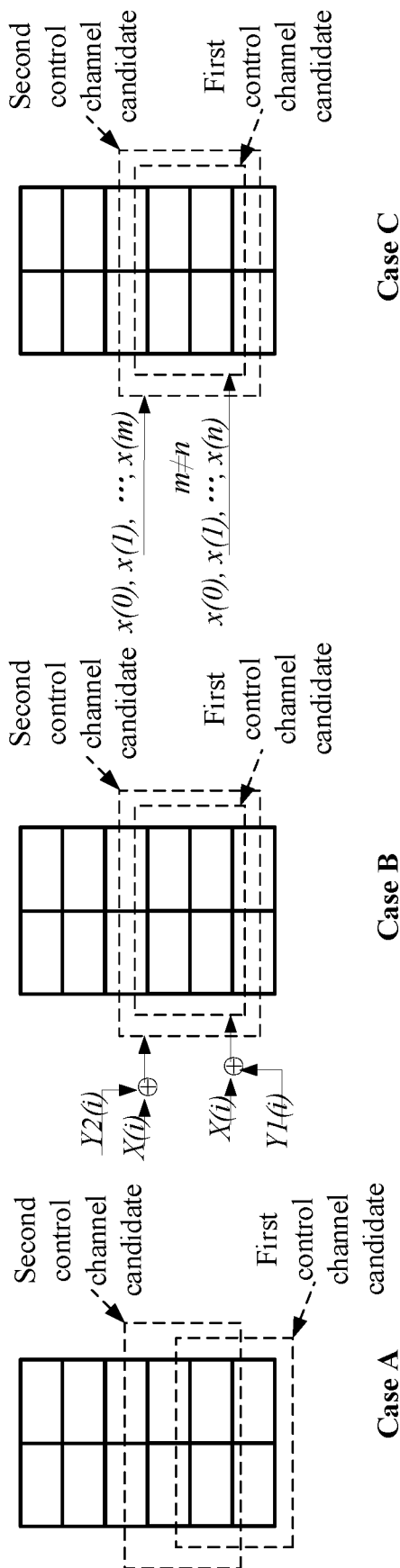
FIG. 11 illustrates a schematic diagram of relationship between a first control channel candidate and a second control channel candidate according to one embodiment of the present disclosure.

Embodiment 11 illustrates a schematic diagram of relationship between a first control channel candidate and a second control channel candidate according to one embodiment of the present disclosure, as shown in FIG. 11. In FIG. 11, as respectively illustrated in Case A, Case B and Case C, each blank rectangle represents a control channel element, and each blank box circled by a dotted-line box represents a control channel element occupied by either a first control channel candidate or a second control channel candidate; as shown in Case A, any control channel element occupied by the first control channel candidate is different from that occupied by the second control channel candidate; as shown in Case B, X(i) represents a payload bit sequence assumed to be carried by a first control channel candidate and a second control channel candidate, Y1(1) and Y2(i) respectively represent scramblings assumed to be employed by the first control channel candidate and the second control channel candidate; as shown in Case C, x(0), x(1), . . . , x(m) respectively represent payload bits of DCI formats assumed to be corresponding to the first control channel candidate, while x(0), x(1), . . . , x(n) respectively represent payload bits of DCI formats assumed to be corresponding to the second control channel candidate.

In Embodiment 11, the fifth information block in the present disclosure is used to determine the M1 control channel candidates in the present disclosure; a first control channel candidate is one of the M1 control channel candidates, and a second control channel candidate is one of the M1 control channel candidates other than the first control channel candidate; control channel elements occupied by the first control channel candidate are different from control channel elements occupied by the second control channel candidate, or a scrambling used by the first control channel candidate is different from a scrambling used by the second control channel candidate, or a payload size of a DCI format corresponding to the first control channel candidate is different from a payload size of a DCI format corresponding to the second control channel candidate.

In one embodiment, the first control channel candidate and the second control channel candidate are separately calculated when calculating the number of monitorings on the M1 control channel candidates.

In one embodiment, the first control channel candidate and the second control channel candidate are counted as two different control channel candidates of the M1 control channel candidates.

In one embodiment, when any control channel element occupied by the first control channel candidate is the same as that occupied by the second control channel candidate, a scrambling employed by the first control channel candidate is different from a scrambling employed by the second control channel candidate or a payload size of a DCI format corresponding to the first control channel candidate is different from a payload size of a DCI format corresponding to the second control channel candidate.

In one embodiment, when a scrambling employed by the first control channel candidate is the same as that employed by the second control channel candidate, any control channel element occupied by the first control channel candidate is different from any control channel element occupied by the second control channel candidate or a payload size of a DCI format corresponding to the first control channel candidate is different from a payload size of a DCI format corresponding to the second control channel candidate.

In one embodiment, when a payload size of a DCI format corresponding to the first control channel candidate is the same as that of a DCI format corresponding to the second control channel candidate, any control channel element occupied by the first control channel candidate is different from any control channel element occupied by the second control channel candidate or a scrambling employed by the first control channel candidate is different from a scrambling employed by the second control channel candidate.

In one embodiment, the phrase that "any control channel element occupied by the first control channel candidate is different from any control channel element occupied by the second control channel candidate" includes a meaning that the number of Control Channel Elements (CCEs) occupied by the first control channel candidate is unequal to the number of CCEs occupied by the second control channel candidate.

In one embodiment, the phrase that "any control channel element occupied by the first control channel candidate is different from any control channel element occupied by the second control channel candidate" includes a meaning that a CCE occupied by the first control channel candidate is not occupied by the second control channel candidate.

In one embodiment, the phrase that "any control channel element occupied by the first control channel candidate is different from any control channel element occupied by the second control channel candidate" includes a meaning that an Aggregation Level (AL) to which the first control channel candidate belongs is different from an AL to which the second control channel candidate belongs.

In one embodiment, the phrase that "a scrambling employed by the first control channel candidate is different from a scrambling employed by the second control channel candidate" includes a meaning that a Scrambling Sequence employed by the first control channel candidate is different from a Scrambling Sequence employed by the second control channel candidate.

In one embodiment, the phrase that "a scrambling employed by the first control channel candidate is different from a scrambling employed by the second control channel candidate" includes a meaning that a sequence type of a Scrambling Sequence employed by the first control channel candidate is different from a sequence type of a Scrambling Sequence employed by the second control channel candidate.

In one embodiment, the phrase that "a scrambling employed by the first control channel candidate is different from a scrambling employed by the second control channel candidate" includes a meaning that a sequence length of a Scrambling Sequence employed by the first control channel candidate is different from a sequence length of a Scrambling Sequence employed by the second control channel candidate.

In one embodiment, the phrase that "a scrambling employed by the first control channel candidate is different from a scrambling employed by the second control channel candidate" includes a meaning that an initial value of a Scrambling Sequence employed by the first control channel candidate is different from an initial value of a Scrambling Sequence employed by the second control channel candidate.

In one embodiment, the phrase that "a scrambling employed by the first control channel candidate is different from a scrambling employed by the second control channel candidate" includes a meaning that an initial value of a generation register of a Scrambling Sequence employed by the first control channel candidate is different from an initial value of a generation register of a Scrambling Sequence employed by the second control channel candidate.

In one embodiment, the phrase that "a payload size of a DCI format corresponding to the first control channel candidate is different from a payload size of a DCI format corresponding to the second control channel candidate" includes a meaning that a Payload Size of a DCI Format corresponding to the first control channel candidate is larger than a Payload Size of a DCI Format corresponding to the second control channel candidate.

In one embodiment, the phrase that "a payload size of a DCI format corresponding to the first control channel candidate is different from a payload size of a DCI format corresponding to the second control channel candidate" includes a meaning that a Payload Size of a DCI Format corresponding to the first control channel candidate is smaller than a Payload Size of a DCI Format corresponding to the second control channel candidate.

In one embodiment, the phrase that "a payload size of a DCI format corresponding to the first control channel candidate is different from a payload size of a DCI format corresponding to the second control channel candidate" includes a meaning that a DCI Format corresponding to the first control channel candidate is different from a DCI Format corresponding to the second control channel candidate.

In one embodiment, the first control channel candidate and the second control channel candidate fulfill at least one of the following conditions:

any control channel element occupied by the first control channel candidate is different from any control channel element occupied by the second control channel candidate;

a scrambling employed by the first control channel candidate is different from a scrambling employed by the second control channel candidate;

a payload size of a DCI format corresponding to the first control channel candidate is different from a payload size of a DCI format corresponding to the second control channel candidate.

Embodiment 12

Figure 12:
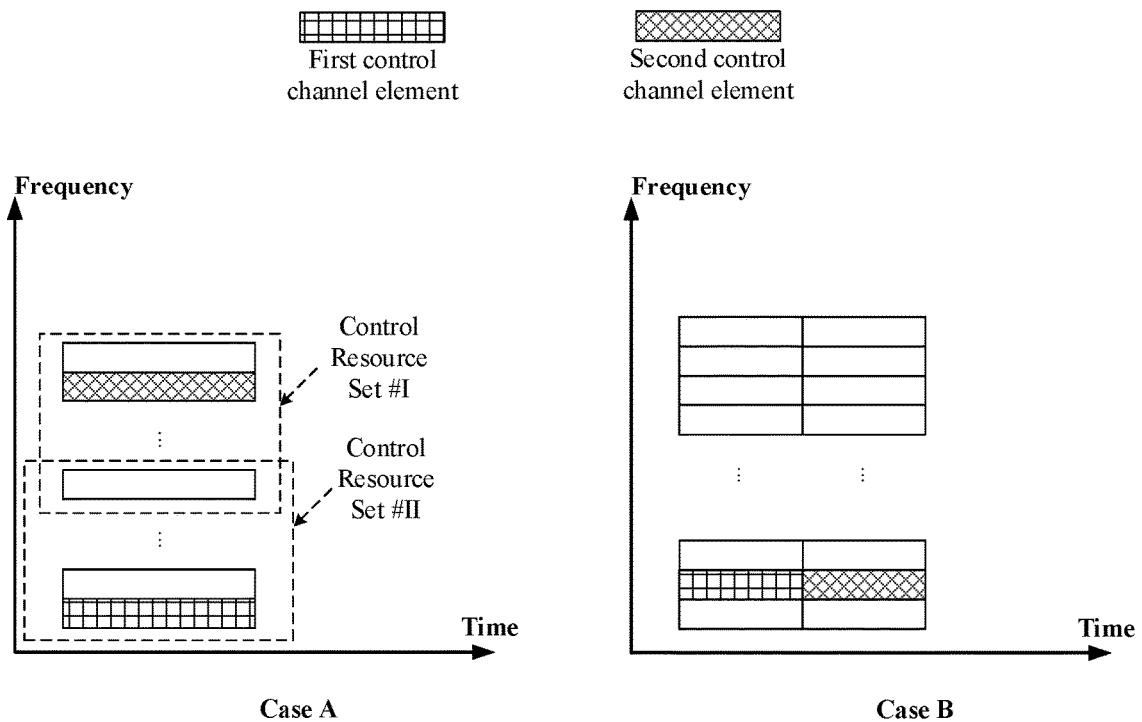
FIG. 12 illustrates a schematic diagram of relationship between a first control channel element and a second control channel element according to one embodiment of the present disclosure.

Embodiment 12 illustrates a schematic diagram of relationship between a first control channel element and a second control channel element according to one embodiment of the present disclosure, as shown in FIG. 12. In FIG. 12, as illustrated in Case A and Case B, the horizontal axis represents time, and the vertical axis represents frequency. Each rectangle represents one of M2 control channel elements, the reticle-filled rectangle represents a first control channel element and the cross-filled rectangle represents a second control resource element; in Case A, control resource elements circled by a dotted-line framed box belong to a control resource set.

In Embodiment 12, a first control channel element is one of the M2 control channel elements in the present disclosure, and a second control channel element is one of the M2 control channel elements other than the first control channel element in the present disclosure; the first control channel element and the second control channel element respectively belong to different control resource sets, or a control channel candidate occupying the first control channel element and a control channel candidate occupying the second control channel element respectively start with different symbols in time domain.

In one embodiment, a time-frequency resource occupied by the first control channel element and a time-frequency resource occupied by the second control channel element are different.

In one embodiment, a time-frequency resource occupied by the first control channel element and a time-frequency resource occupied by the second control channel element are the same.

In one embodiment, the first control channel element and the second control channel element are non-overlapped.

In one embodiment, the phrase that "the first control channel element and the second control channel element respectively belong to different control resource sets" includes a meaning that the first control channel element belongs to a first control resource set, while the second control channel element belongs to a second control resource set; the first control resource set is a CORESET, and the second control resource set is a CORESET, the first CORESET being different from the second CORESET.

In one embodiment, the phrase that "the first control channel element and the second control channel element respectively belong to different control resource sets" includes a meaning that the first control channel element and the second control channel element respectively belong to CORESETs configured with different indexes.

In one embodiment, the phrase that "the first control channel element and the second control channel element respectively belong to different control resource sets" includes a meaning that the first control channel element belongs to a first control resource set, while the second control channel element belongs to a second control resource set; the first control resource set is a CORESET, and the second control resource set is a CORESET, and the first CORESET and the second CORESET comprise different time-frequency resources.

In one embodiment, the phrase that "the first control channel element and the second control channel element respectively belong to different control resource sets" includes a meaning that the first control channel element belongs to a first control resource set, while the second control channel element belongs to a second control resource set; the first control resource set is a CORESET, and the second control resource set is a CORESET, and an index of the first CORESET is different from that of the second CORESET.

In one embodiment, the phrase that "the first control channel element and the second control channel element respectively belong to different control resource sets" includes a meaning that the first control channel element belongs to a first control resource set, while the second control channel element belongs to a second control resource set; the first control resource set is a CORESET, and the second control resource set is a CORESET, a time-frequency resource comprised by the first CORESET is the same as that comprised by the second CORESET, and an index of the first CORESET is different from that of the second CORESET.

In one embodiment, the phrase that "a control channel candidate occupying the first control channel element and a control channel candidate occupying the second control channel element respectively start with different symbols in time domain" includes a meaning that a third control channel candidate occupies the first control channel element, and a fourth control channel candidate occupies the second control channel element, and a Starting Symbol/First Symbol occupied by the third control channel candidate in time domain is different from that occupied by the fourth control channel candidate in time domain.

In one embodiment, the phrase that "a control channel candidate occupying the first control channel element and a control channel candidate occupying the second control channel element respectively start with different symbols in time domain" includes a meaning that two control channel candidates respectively occupying the first control channel element and the second control channel element occupy different time-domain resources.

In one embodiment, the phrase that "a control channel candidate occupying the first control channel element and a control channel candidate occupying the second control channel element respectively start with different symbols in time domain" includes a meaning that Starting Symbols/First Symbols occupied by two control channel candidates respectively occupying the first control channel element and the second control channel element are indexed by different indexes in the first time window.

In one embodiment, the phrase that "a control channel candidate occupying the first control channel element and a control channel candidate occupying the second control channel element respectively start with different symbols in time domain" includes a meaning that Starting Symbols/First Symbols occupied by two control channel candidates respectively occupying the first control channel element and the second control channel element are indexed by different indexes in belonging slots.

In one embodiment, a Starting Symbol of a control channel candidate occupying the first control channel element is an OFDM symbol, and a Starting Symbol of a control channel candidate occupying the second control channel element is an OFDM symbol.

In one embodiment, the first control channel element and the second control channel element fulfill at least one of the following conditions:

the first control channel element and the second control channel element respectively belong to different control resource sets;

a control channel candidate occupying the first control channel element and a control channel candidate occupying the second control channel element respectively start with different symbols in time domain.

Embodiment 13

Figure 13:
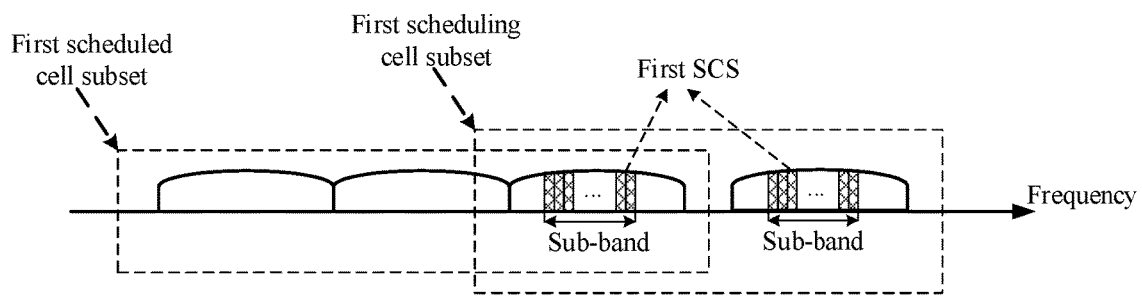
FIG. 13 illustrates a schematic diagram of sub-band(s) in a first sub-band set according to one embodiment of the present disclosure.

Embodiment 13 illustrates a schematic diagram of sub-band(s) in a first sub-band set according to one embodiment of the present disclosure, as shown in FIG. 13. In FIG. 13, the horizontal axis represents frequency, each box with an arched top represents a serving cell, two boxes framed with dotted lines respectively represent a first scheduled cell subset and a first scheduling cell subset, and each cross-filled column bar represents a subcarrier comprised by a sub-band in the first sub-band set.

In Embodiment 13, the M1 control channel candidates in the present disclosure are monitored in sub-band(s) comprised by a first sub-band set, the first sub-band set comprising a positive integer number of serving cell(s); a serving cell to which any sub-band comprised by the first sub-band set belongs in frequency domain belongs to the first scheduling cell subset in the present disclosure; an SCS of subcarriers comprised in any sub-band comprised by the first sub-band set is equal to the first SCS in the present disclosure.

In one embodiment, the number of serving cell(s) comprised by the first scheduling cell subset is equal to the number of sub-band(s) comprised by the first sub-band set.

In one embodiment, the number of serving cells comprised by the first scheduling cell subset is greater than the number of sub-band(s) comprised by the first sub-band set.

In one embodiment, the number of serving cell(s) comprised by the first scheduling cell subset is no less than the number of sub-band(s) comprised by the first sub-band set.

In one embodiment, the phrase that "the M1 control channel candidates are monitored in sub-band(s) comprised by a first sub-band set" includes a meaning that any sub-band to which a frequency-domain resource occupied by any of the M1 control channel candidates belongs is a part of the first sub-band set.

In one embodiment, the phrase that "the M1 control channel candidates are monitored in sub-band(s) comprised by a first sub-band set" includes a meaning that the sub-band(s) comprised by the first sub-band set comprises(comprise) a frequency-domain resource occupied by any of the M1 control channel candidates.

In one embodiment, the phrase that "the M1 control channel candidates are monitored in sub-band(s) comprised by a first sub-band set" includes a meaning that any sub-band comprised in the first sub-band set comprises a frequency-domain resource occupied by at least one of the M1 control channel candidates.

In one embodiment, the first sub-band set only comprises one sub-band.

In one embodiment, the first sub-band set comprises more than one sub-band.

In one embodiment, any sub-band comprised in the first sub-band set is a Bandwidth Part (BWP).

In one embodiment, any sub-band comprised in the first sub-band set is an Active Downlink Bandwidth Part (Active DL BWP).

In one embodiment, any sub-band comprised in the first sub-band set is contiguous frequency-domain resources sharing a same Numerology in a Carrier Bandwidth.

In one embodiment, any sub-band comprised in the first sub-band set is frequency-domain contiguous subcarriers sharing a same Numerology in a Carrier Bandwidth.

In one embodiment, any sub-band comprised in the first sub-band set is a Common Resource Block Subset for a given Numerology on a given carrier that comprises contiguous Common Resource Blocks (CRBs).

In one embodiment, a serving cell to which any sub-band comprised in the first sub-band set belongs is a serving cell corresponding to a carrier to which any sub-band comprised in the first sub-band set belongs.

In one embodiment, when the first sub-band set comprises more than one sub-band, any two sub-bands comprised in the first sub-band set respectively belong to two different serving cells comprised by the first scheduling cell subset.

In one embodiment, when the first sub-band set comprises more than one sub-band, there are two sub-bands in the first sub-band set belonging to a same serving cell comprised in the first scheduling cell subset.

In one embodiment, a sub-band to which any of the M2 control channel elements belongs in frequency domain is a sub-band in the first sub-band set.

In one embodiment, when the first sub-band set comprises more than one sub-band, there are two control channel elements of the M2 control channel elements respectively belonging to two different sub-bands in the first sub-band set.

In one embodiment, each sub-band comprised in the first sub-band set comprises at least one of the M2 control channel elements in frequency domain.

In one embodiment, any sub-band comprised in the first sub-band set is configurable.

In one embodiment, further comprising:

receiving a seventh information block;

herein, the seventh information block is used to determine each sub-band in the first sub-band set and an SCS of subcarriers comprised in each sub-band in the first sub-band set.

In one embodiment, the phrase that "a serving cell to which any sub-band comprised by the first sub-band set belongs in frequency domain belongs to the first scheduling cell subset" includes a meaning that the first scheduling cell subset comprises a serving cell to which any sub-band comprised by the first sub-band set belongs in frequency domain.

In one embodiment, the phrase that "a serving cell to which any sub-band comprised by the first sub-band set belongs in frequency domain belongs to the first scheduling cell subset" includes a meaning that the first scheduling cell subset only comprises serving cell(s) to which sub-band(s) comprised by the first sub-band set belongs(belong) in frequency domain.

In one embodiment, the first scheduling cell subset also comprises a serving cell other than any serving cell to which any sub-band comprised by the first sub-band set belongs in frequency domain.

In one embodiment, the phrase that "a serving cell to which any sub-band comprised by the first sub-band set belongs in frequency domain belongs to the first scheduling cell subset" includes a meaning that the first sub-band set comprises B1 sub-bands, and the first scheduling cell subset comprises B1 serving cells, the B1 serving cells respectively comprising the B1 sub-bands, B1 being a positive integer.

In one embodiment, the phrase that "a serving cell to which any sub-band comprised by the first sub-band set belongs in frequency domain belongs to the first scheduling cell subset" includes a meaning that a serving cell corresponding to a carrier to which any sub-band comprised in the first sub-band belongs is a part of the first scheduling cell subset.

In one embodiment, when the first sub-band set comprises more than one sub-band, any two sub-bands in the first sub-band set comprise subcarriers of an equal SCS.

In one embodiment, an SCS of any subcarrier comprised by any sub-band in the first sub-band set is equal to the first SCS.

In one embodiment, the first sub-band set comprises more than one subcarrier, and any two subcarriers comprised by the first sub-band set are of an equal SCS.

In one embodiment, any sub-band comprised in the first sub-band set comprises a positive integral multiple of 12 subcarriers.

Embodiment 14

Figure 14:
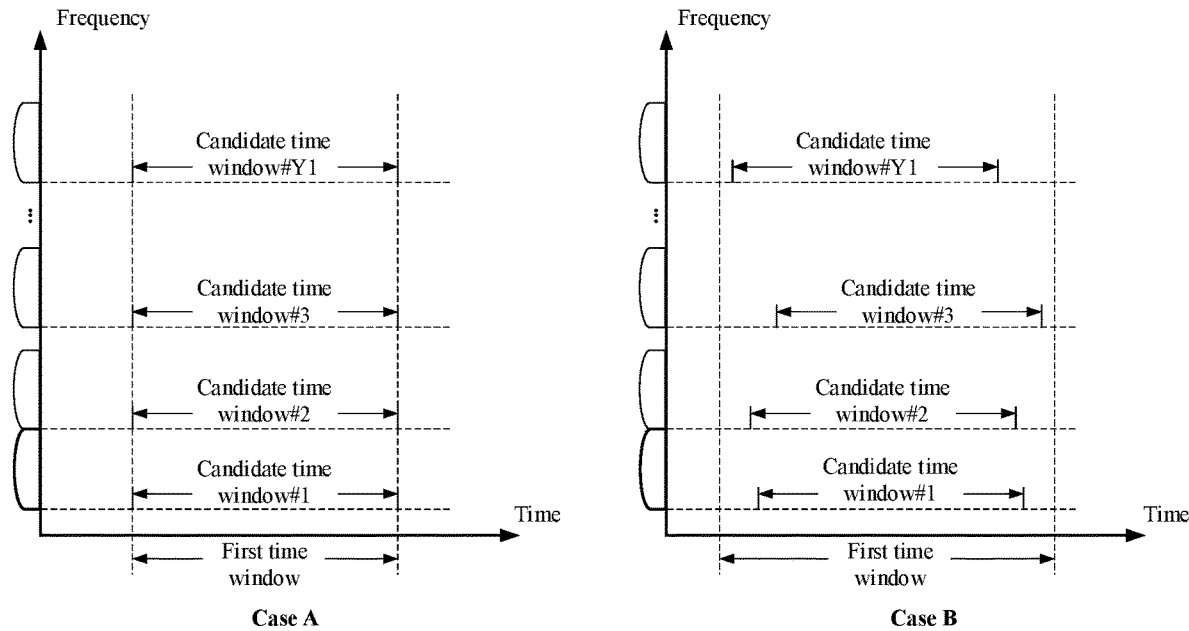
FIG. 14 illustrates a schematic diagram of Y1 candidate time windows according to one embodiment of the present disclosure.

Embodiment 14 illustrates a schematic diagram of Y1 candidate time windows according to one embodiment of the present disclosure, as shown in FIG. 14. In FIG. 14, the horizontal axis represents time, and the vertical axis represents frequency, each blank enclosure with an arched top represents a serving cell comprised by a first scheduling cell subset; in Case A, any of the Y1 candidate time windows is the same as a first time window; in Case B, there is one candidate time window among the Y1 candidate time windows occupying a part of the first time window.

In Embodiment 14, the first scheduling cell subset in the present disclosure comprises Y1 serving cells, Y1 being a positive integer greater than 1, the combination employed by the serving cells comprised by the first scheduling cell subset is used to determine Y1 candidate time windows respectively in the Y1 serving cells, any of the Y1 candidate time windows belonging to the first time window in the present disclosure.

In one embodiment, the first scheduling cell subset only comprises the Y1 serving cells.

In one embodiment, the first scheduling cell subset comprises a serving cell other than the Y1 serving cells.

In one embodiment, any two of the Y1 serving cells are different.

In one embodiment, any two of the Y1 candidate time windows are aligned.

In one embodiment, any two of the Y1 candidate time windows are synchronized.

In one embodiment, any two of the Y1 candidate time windows are the same.

In one embodiment, there are two candidate time windows of the Y1 candidate time windows being different.

In one embodiment, any two of the Y1 candidate time windows are overlapped or partially overlapped.

In one embodiment, there are two candidate time windows of the Y1 candidate time windows being orthogonal.

In one embodiment, any of the Y1 candidate time windows comprises a positive integer number of time-domain contiguous multicarrier symbols.

In one embodiment, any two of the Y1 candidate time windows are the same, and any of the Y1 candidate time windows is the same as the first time window.

In one embodiment, there is a candidate time window of the Y1 candidate time windows occupying part of a time-domain resource in the first time window.

In one embodiment, any of the Y1 candidate time windows is a span.

In one embodiment, the phrase that "the combination employed by the serving cells comprised by the first scheduling cell subset is used to determine Y1 candidate time windows respectively in the Y1 serving cells" includes a meaning that the combination employed by the serving cell(s) comprised by the first scheduling cell subset is used by the first node in the present disclosure for determining the Y1 candidate time windows respectively in the Y1 serving cells.

In one embodiment, the phrase that "the combination employed by the serving cells comprised by the first scheduling cell subset is used to determine Y1 candidate time windows respectively in the Y1 serving cells" includes a meaning that a result of a linear operation of two positive integers comprised in the combination employed by the serving cell(s) comprised by the first scheduling cell subset is used for determining the Y1 candidate time windows respectively in the Y1 serving cells.

In one embodiment, the phrase that "the combination employed by the serving cells comprised by the first scheduling cell subset is used to determine Y1 candidate time windows respectively in the Y1 serving cells" includes a meaning that the combination employed by the serving cell(s) comprised by the first scheduling cell subset and a CORESET of the Y1 serving cells are used to determine the Y1 candidate time windows respectively in the Y1 serving cells.

In one embodiment, the phrase that "the combination employed by the serving cells comprised by the first scheduling cell subset is used to determine Y1 candidate time windows respectively in the Y1 serving cells" includes a meaning that a smaller value between a number of multicarrier symbols occupied by a CORESET of the Y1 serving cells and a smaller value between two positive integers comprised in the combination employed by the serving cell(s) comprised by the first scheduling cell subset is used for determining Y1 candidate time windows respectively in the Y1 serving cells.

In one embodiment, the phrase that "the combination employed by the serving cells comprised by the first scheduling cell subset is used to determine Y1 candidate time windows respectively in the Y1 serving cells" includes a meaning that a smaller value between two positive integers comprised in the combination employed by the serving cell(s) comprised by the first scheduling cell subset is used for determining Y1 candidate time windows respectively in the Y1 serving cells.

Embodiment 15

Figure 15:
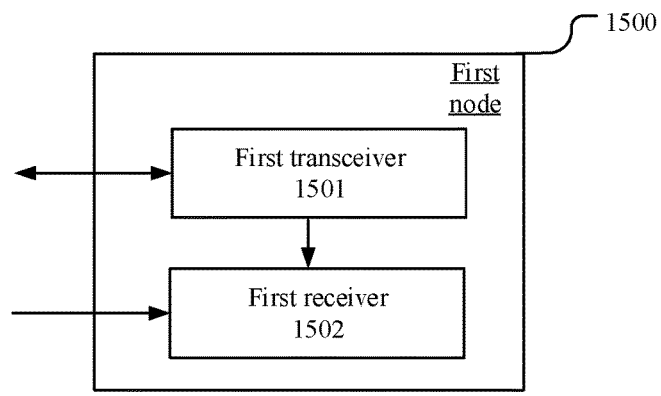
FIG. 15 illustrates a structure block diagram of a processing device in a first node according to one embodiment of the present disclosure.

Embodiment 15 illustrates a structure block diagram of a processing device in a first node according to one embodiment, as shown in FIG. 15. In FIG. 15, a processing device 1500 in a first node comprises a first transceiver 1501 and a first receiver 1502. The first transceiver 1501 comprises the transmitter/receiver 456 (comprising the antenna 460), the transmitting processor 455, the receiving processor 452 and the controller/processor 490 in FIG. 4 of the present disclosure; the first receiver 1502 comprises the transmitter/receiver 456 (comprising the antenna 460), the receiving processor 452 and the controller/processor 490 in FIG. 4 of the present disclosure.

In Embodiment 15, the first transceiver 1501 receives a first information block and transmits a second information block, the first information block being used to determine a scheduled cell set, the scheduled cell set comprising more than one serving cell, the scheduled cell set comprises a first scheduled cell subset, the first scheduled cell subset comprising a positive integer number of serving cell(s), and any serving cell comprised by the first scheduled cell subset belonging to the scheduled cell set; the second receiver 1502 monitors M1 control channel candidates in a first time window, the M1 control channel candidates occupying M2 control channel elements, M1 being a positive integer greater than 1, and M2 being a positive integer greater than 1, and the first time window comprising a positive integer number of time-domain consecutive multicarrier symbols; herein, a first scheduling cell subset comprises scheduling cell(s) of serving cell(s) comprised by the first scheduled cell subset, and the M1 control channel candidates are monitored in serving cell(s) comprised by the first scheduling cell subset, the first scheduling cell subset comprising a positive integer number of serving cell(s); the second information block is used to indicate a combination employed by the serving cell(s) comprised by the first scheduling cell subset, and the combination employed by the serving cell(s) comprised by the first scheduling cell subset comprises two positive integers; a subcarrier spacing (SCS) of subcarriers occupied by one of the M2 control channel elements in frequency domain is equal to a first SCS, and the first SCS is used to determine a time length of a multicarrier symbol comprised by the first time window, and the combination employed by the serving cell(s) comprised by the first scheduling cell subset is used to determine a number of multicarrier symbols comprised by the first time window; M1 is no greater than a first threshold, M2 is no greater than a second threshold, and both the first threshold and the second threshold are positive integers; a number of serving cell(s) comprised by the first scheduled cell subset and a number of serving cells comprised by the scheduled cell set are jointly used to determine the first threshold and the second threshold.

In one embodiment, a first-type monitoring capability is employed in a scheduling cell of any serving cell comprised by the scheduled cell set, the first information block being used to indicate the first-type monitoring capability; no more than one CORESET pool is provided in the scheduling cell of any serving cell comprised by the scheduled cell set.

In one embodiment, a ratio of the number of serving cell(s) comprised by the first scheduled cell subset to a number of serving cell(s) comprised by the scheduled cell set being associated with at least one control channel candidate is used to determine a first parameter; the first threshold is equal to a maximum integer no greater than a first intermediate value, and the first intermediate value is proportional to the first parameter; the second threshold is equal to a maximum integer no greater than a second intermediate value, and the second intermediate value is proportional to the first parameter.

In one embodiment, a second parameter is used to determine the first threshold and the second threshold, the second parameter being a positive integer; the second parameter is equal to the number of serving cells comprised by the scheduled cell set; or the first transceiver 1501 transmits a third information block; herein, the third information block is used to indicate the second parameter.

In one embodiment, the first SCS is one of X candidate SCSs, X being a positive integer greater than 1; the X candidate SCSs respectively correspond to X first-type candidate parameters, and any of the X first-type candidate parameters is a positive integer, the X candidate SCSs respectively correspond to X second-type candidate parameters, and any of the X second-type candidate parameters is a positive integer; a third parameter is one of the X first-type candidate parameters, and the third parameter is used to determine the first threshold; a fourth parameter is one of the X second-type candidate parameters, and the fourth parameter is used to determine the second threshold; the first SCS is used to determine the third parameter out of the X first-type candidate parameters, and the first SCS is used to determine the fourth parameter out of the X second-type candidate parameters.

In one embodiment, the first transceiver 1501 receives a fourth information block; herein, the fourth information block is used to determine M3 control resource sets, M3 being a positive integer greater than 1, and a control resource set to which any one of the M2 control channel elements belongs is one of the M3 control resource sets; the second information block is used to indicate a target combination set, the target combination set comprising a positive integer number of combination(s), a combination employed by the serving cell(s) comprised by the first scheduling cell subset belongs to the target combination set; the number of multicarrier symbols comprised by the first time window is equal to a larger value between a first symbol quantity and a second symbol quantity; the first symbol quantity is equal to a maximum value of numbers of multicarrier symbols respectively occupied by the M3 control resource sets in time domain, while the second symbol quantity is equal to a minimum value of positive integers comprised by the combination(s) in the target combination set.

In one embodiment, the first transceiver 1501 receives a fifth information block; herein, the fifth information block is used to determine the M1 control channel candidates; a first control channel candidate is one of the M1 control channel candidates, and a second control channel candidate is one of the M1 control channel candidates other than the first control channel candidate; control channel elements occupied by the first control channel candidate are different from control channel elements occupied by the second control channel candidate, or a scrambling used by the first control channel candidate is different from a scrambling used by the second control channel candidate, or a payload size of a downlink control information (DCI) format corresponding to the first control channel candidate is different from a payload size of a DCI format corresponding to the second control channel candidate.

In one embodiment, a first control channel element is one of the M2 control channel elements, and a second control channel element is one of the M2 control channel elements other than the first control channel element; the first control channel element and the second control channel element respectively belong to different control resource sets, or a control channel candidate occupying the first control channel element and a control channel candidate occupying the second control channel element respectively start with different symbols in time domain.

In one embodiment, the M1 control channel candidates are monitored in sub-band(s) comprised by a first sub-band set, the first sub-band set comprising a positive integer number of serving cell(s); a serving cell to which any sub-band comprised by the first sub-band set belongs in frequency domain belongs to the first scheduling cell subset; a subcarrier spacing (SCS) of subcarriers comprised in any sub-band comprised by the first sub-band set is equal to the first SCS.

In one embodiment, the first scheduling cell subset comprises Y1 serving cells, Y1 being a positive integer greater than 1, the combination employed by the serving cells comprised by the first scheduling cell subset is used to determine Y1 candidate time windows respectively in the Y1 serving cells, any of the Y1 candidate time windows belonging to the first time window.

Embodiment 16

Figure 16:
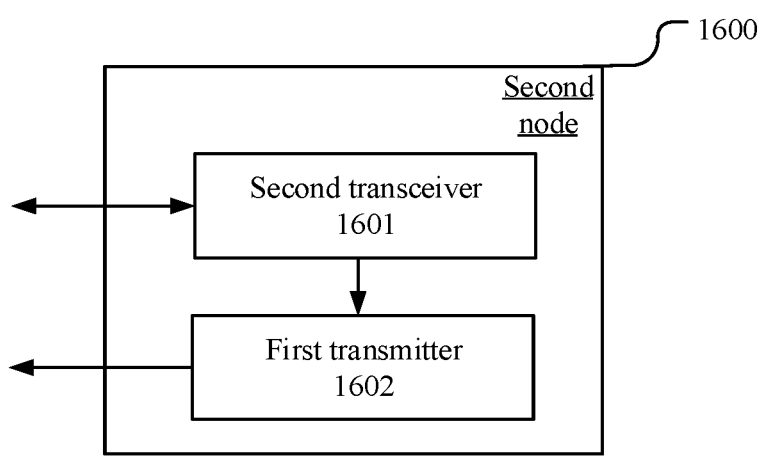
FIG. 16 illustrates a structure block diagram of a processing device in a second node according to one embodiment of the present disclosure.

Embodiment 16 illustrates a structure block diagram of a processing device in a second node according to one embodiment, as shown in FIG. 16. In FIG. 16, a processing 1600 in a second node comprises a second transceiver 1601 and a first transmitter 1602. The second transceiver 1601 comprises the transmitter/receiver 416 (comprising the antenna 420), the receiving processor 412, the transmitting processor 415 and the controller/processor 440 in FIG. 4 of the present disclosure; the first transmitter 1602 comprises the transmitter/receiver 416 (comprising the antenna 420), the transmitting processor 415 and the controller/processor 440 in FIG. 4 of the present disclosure.

In Embodiment 16, the second transceiver 1601 transmits a first information block and receives a second information block, the first information block being used to indicate a scheduled cell set, the scheduled cell set comprising more than one serving cell, the scheduled cell set comprises a first scheduled cell subset, the first scheduled cell subset comprising a positive integer number of serving cell(s), and any serving cell comprised by the first scheduled cell subset belonging to the scheduled cell set; the first transmitter 1602 determines M1 control channel candidates in a first time window, the M1 control channel candidates occupying M2 control channel elements, M1 being a positive integer greater than 1, and M2 being a positive integer greater than 1, and the first time window comprising a positive integer number of time-domain consecutive multicarrier symbols; herein, a first scheduling cell subset comprises scheduling cell(s) of serving cell(s) comprised by the first scheduled cell subset, and the M1 control channel candidates are monitored in serving cell(s) comprised by the first scheduling cell subset, the first scheduling cell subset comprising a positive integer number of serving cell(s); the second information block is used to indicate a combination employed by the serving cell(s) comprised by the first scheduling cell subset, and the combination employed by the serving cell(s) comprised by the first scheduling cell subset comprises two positive integers; a subcarrier spacing (SCS) of subcarriers occupied by one of the M2 control channel elements in frequency domain is equal to a first SCS, and the first SCS is used to determine a time length of a multicarrier symbol comprised by the first time window, and the combination employed by the serving cell(s) comprised by the first scheduling cell subset is used to determine a number of multicarrier symbols comprised by the first time window; M1 is no greater than a first threshold, M2 is no greater than a second threshold, and both the first threshold and the second threshold are positive integers; a number of serving cell(s) comprised by the first scheduled cell subset and a number of serving cells comprised by the scheduled cell set are jointly used to determine the first threshold and the second threshold.

In one embodiment, a first-type monitoring capability is employed in a scheduling cell of any serving cell comprised by the scheduled cell set, the first information block being used to indicate the first-type monitoring capability; no more than one CORESET pool is provided in the scheduling cell of any serving cell comprised by the scheduled cell set.

In one embodiment, a ratio of the number of serving cell(s) comprised by the first scheduled cell subset to a number of serving cell(s) comprised by the scheduled cell set being associated with at least one control channel candidate is used to determine a first parameter; the first threshold is equal to a maximum integer no greater than a first intermediate value, and the first intermediate value is proportional to the first parameter; the second threshold is equal to a maximum integer no greater than a second intermediate value, and the second intermediate value is proportional to the first parameter.

In one embodiment, a second parameter is used to determine the first threshold and the second threshold, the second parameter being a positive integer; the second parameter is equal to the number of serving cells comprised by the scheduled cell set; or the second transceiver 1601 receives a third information block; herein, the third information block is used to indicate the second parameter.

In one embodiment, the first SCS is one of X candidate SCSs, X being a positive integer greater than 1; the X candidate SCSs respectively correspond to X first-type candidate parameters, and any of the X first-type candidate parameters is a positive integer, the X candidate SCSs respectively correspond to X second-type candidate parameters, and any of the X second-type candidate parameters is a positive integer; a third parameter is one of the X first-type candidate parameters, and the third parameter is used to determine the first threshold; a fourth parameter is one of the X second-type candidate parameters, and the fourth parameter is used to determine the second threshold; the first SCS is used to determine the third parameter out of the X first-type candidate parameters, and the first SCS is used to determine the fourth parameter out of the X second-type candidate parameters.

In one embodiment, the second transceiver 1601 transmits a fourth information block; herein, the fourth information block is used to determine M3 control resource sets, M3 being a positive integer greater than 1, and a control resource set to which any one of the M2 control channel elements belongs is one of the M3 control resource sets; the second information block is used to indicate a target combination set, the target combination set comprising a positive integer number of combination(s), a combination employed by the serving cell(s) comprised by the first scheduling cell subset belongs to the target combination set; the number of multicarrier symbols comprised by the first time window is equal to a larger value between a first symbol quantity and a second symbol quantity; the first symbol quantity is equal to a maximum value of numbers of multicarrier symbols respectively occupied by the M3 control resource sets in time domain, while the second symbol quantity is equal to a minimum value of positive integers comprised by the combination(s) in the target combination set.

In one embodiment, the second transceiver 1601 transmits a fifth information block; herein, the fifth information block is used to indicate the M1 control channel candidates; a first control channel candidate is one of the M1 control channel candidates, and a second control channel candidate is one of the M1 control channel candidates other than the first control channel candidate; control channel elements occupied by the first control channel candidate are different from control channel elements occupied by the second control channel candidate, or a scrambling used by the first control channel candidate is different from a scrambling used by the second control channel candidate, or a payload size of a downlink control information (DCI) format corresponding to the first control channel candidate is different from a payload size of a DCI format corresponding to the second control channel candidate.

In one embodiment, a first control channel element is one of the M2 control channel elements, and a second control channel element is one of the M2 control channel elements other than the first control channel element; the first control channel element and the second control channel element respectively belong to different control resource sets, or a control channel candidate occupying the first control channel element and a control channel candidate occupying the second control channel element respectively start with different symbols in time domain.

In one embodiment, the M1 control channel candidates are monitored in sub-band(s) comprised by a first sub-band set, the first sub-band set comprising a positive integer number of serving cell(s); a serving cell to which any sub-band comprised by the first sub-band set belongs in frequency domain belongs to the first scheduling cell subset; a subcarrier spacing (SCS) of subcarriers comprised in any sub-band comprised by the first sub-band set is equal to the first SCS.

In one embodiment, the first scheduling cell subset comprises Y1 serving cells, Y1 being a positive integer greater than 1, the combination employed by the serving cells comprised by the first scheduling cell subset is used to determine Y1 candidate time windows respectively in the Y1 serving cells, any of the Y1 candidate time windows belonging to the first time window.

The ordinary skill in the art may understand that all or part of steps in the above method may be implemented by instructing related hardware through a program. The program may be stored in a computer readable storage medium, for example Read-Only-Memory (ROM), hard disk or compact disc, etc. Optionally, all or part of steps in the above embodiments also may be implemented by one or more integrated circuits. Correspondingly, each module unit in the above embodiment may be implemented in the form of hardware, or in the form of software function modules. The present disclosure is not limited to any combination of hardware and software in specific forms. The first node or the second node, or a UE or a terminal in the present disclosure includes but is not limited to mobile phones, tablet computers, notebooks, network cards, low-consumption equipment, enhanced MTC (eMTC) terminals, NB-IOT terminals, vehicle-mounted communication equipment, aircrafts, aircrafts, droners, telecontrolled diminutive airplanes, etc. The base station or network-side equipment in the present disclosure includes but is not limited to macro-cellular base stations, micro-cellular base stations, home base stations, relay base station, eNB, gNB, Transmitter Receiver Point (TRP), relay satellite, satellite base station, airborne base station and other radio communication equipment.

The above are merely the preferred embodiments of the present disclosure and are not intended to limit the scope of protection of the present disclosure. Any modification, equivalent substitute and improvement made within the spirit and principle of the present disclosure are intended to be included within the scope of protection of the present disclosure.

What is claimed is:

1. A first node for wireless communications, comprising:
a first transceiver, which receives a first information block and transmits a second information block, the first information block being used to determine a scheduled cell set, the scheduled cell set comprising more than one serving cell, the scheduled cell set comprises a first scheduled cell subset, the first scheduled cell subset comprising a positive integer number of serving cell(s), and any serving cell comprised by the first scheduled cell subset belonging to the scheduled cell set;
a first receiver, which monitors M1 control channel candidates in a first time window, the M1 control channel candidates occupying M2 control channel elements, M1 being a positive integer greater than 1, and M2 being a positive integer greater than 1, and the first time window comprising a positive integer number of time-domain consecutive multicarrier symbols;
wherein a first scheduling cell subset comprises scheduling cell(s) of serving cell(s) comprised by the first scheduled cell subset, and the M1 control channel candidates are monitored in serving cell(s) comprised by the first scheduling cell subset, the first scheduling cell subset comprising a positive integer number of serving cell(s); the second information block is used to indicate a combination employed by the serving cell(s) comprised by the first scheduling cell subset, and the combination employed by the serving cell(s) comprised by the first scheduling cell subset comprises two positive integers; a subcarrier spacing (SCS) of subcarriers occupied by one of the M2 control channel elements in frequency domain is equal to a first SCS, and the first SCS is used to determine a time length of a multicarrier symbol comprised by the first time window, and the combination employed by the serving cell(s) comprised by the first scheduling cell subset is used to determine a number of multicarrier symbols comprised by the first time window; M1 is no greater than a first threshold, M2 is no greater than a second threshold, and both the first threshold and the second threshold are positive integers; a number of serving cell(s) comprised by the first scheduled cell subset and a number of serving cells comprised by the scheduled cell set are jointly used to determine the first threshold and the second threshold.

2. The first node according to claim 1, is characterized in employing a first-type monitoring capability in a scheduling cell of any serving cell comprised by the scheduled cell set, the first information block being used to indicate the first-type monitoring capability; no more than one control resource set (CORESET) pool is provided in the scheduling cell of any serving cell comprised by the scheduled cell set.

3. The first node according to claim 1, wherein a ratio of the number of serving cell(s) comprised by the first scheduled cell subset to a number of serving cell(s) comprised by the scheduled cell set being associated with at least one control channel candidate is used to determine a first parameter; the first threshold is equal to a maximum integer no greater than a first intermediate value, and the first intermediate value is proportional to the first parameter; the second threshold is equal to a maximum integer no greater than a second intermediate value, and the second intermediate value is proportional to the first parameter.

4. The first node according to claim 1, wherein a second parameter is used to determine the first threshold and the second threshold, the second parameter being a positive integer; the second parameter is equal to the number of serving cells comprised by the scheduled cell set; or, the first transceiver transmits a third information block, wherein the third information block is used to indicate the second parameter.

5. The first node according to claim 1, wherein the first SCS is one of X candidate SCSs, X being a positive integer greater than 1; the X candidate SCSs respectively correspond to X first-type candidate parameters, and any of the X first-type candidate parameters is a positive integer, the X candidate SCSs respectively correspond to X second-type candidate parameters, and any of the X second-type candidate parameters is a positive integer; a third parameter is one of the X first-type candidate parameters, and the third parameter is used to determine the first threshold; a fourth parameter is one of the X second-type candidate parameters, and the fourth parameter is used to determine the second threshold; the first SCS is used to determine the third parameter out of the X first-type candidate parameters, and the first SCS is used to determine the fourth parameter out of the X second-type candidate parameters.

6. The first node according to claim 1, wherein the first transceiver receives a fourth information block, wherein the fourth information block is used to determine M3 control resource sets, M3 being a positive integer greater than 1, and a control resource set to which any one of the M2 control channel elements belongs is one of the M3 control resource sets; the second information block is used to indicate a target combination set, the target combination set comprising a positive integer number of combination(s), a combination employed by the serving cell(s) comprised by the first scheduling cell subset belongs to the target combination set; the number of multicarrier symbols comprised by the first time window is equal to a larger value between a first symbol quantity and a second symbol quantity; the first symbol quantity is equal to a maximum value of numbers of multicarrier symbols respectively occupied by the M3 control resource sets in time domain, while the second symbol quantity is equal to a minimum value of positive integers comprised by the combination(s) in the target combination set.

7. The first node according to claim 1, wherein the first scheduling cell subset comprises Y1 serving cells, Y1 being a positive integer greater than 1, the combination employed by the serving cells comprised by the first scheduling cell subset is used to determine Y1 candidate time windows respectively in the Y1 serving cells, any of the Y1 candidate time windows belonging to the first time window.

8. A second node for wireless communications, comprising:

a second transceiver, which transmits a first information block and receives a second information block, the first information block being used to indicate a scheduled cell set, the scheduled cell set comprising more than one serving cell, the scheduled cell set comprises a first scheduled cell subset, the first scheduled cell subset comprising a positive integer number of serving cell(s), and any serving cell comprised by the first scheduled cell subset belonging to the scheduled cell set;

a first transmitter, which determines M1 control channel candidates in a first time window, the M1 control channel candidates occupying M2 control channel elements, M1 being a positive integer greater than 1, and M2 being a positive integer greater than 1, and the first time window comprising a positive integer number of time-domain consecutive multicarrier symbols;

wherein a first scheduling cell subset comprises scheduling cell(s) of serving cell(s) comprised by the first scheduled cell subset, and the M1 control channel candidates are monitored in serving cell(s) comprised by the first scheduling cell subset, the first scheduling cell subset comprising a positive integer number of serving cell(s); the second information block is used to indicate a combination employed by the serving cell(s) comprised by the first scheduling cell subset, and the combination employed by the serving cell(s) comprised by the first scheduling cell subset comprises two positive integers; a subcarrier spacing (SCS) of subcarriers occupied by one of the M2 control channel elements in frequency domain is equal to a first SCS, and the first SCS is used to determine a time length of a multicarrier symbol comprised by the first time window, and the combination employed by the serving cell(s) comprised by the first scheduling cell subset is used to determine a number of multicarrier symbols comprised by the first time window; M1 is no greater than a first threshold, M2 is no greater than a second threshold, and both the first threshold and the second threshold are positive integers; a number of serving cell(s) comprised by the first scheduled cell subset and a number of serving cells comprised by the scheduled cell set are jointly used to determine the first threshold and the second threshold.

9. The second node according to claim 8, is characterized in employing a first-type monitoring capability in a scheduling cell of any serving cell comprised by the scheduled cell set, the first information block being used to indicate the first-type monitoring capability; no more than one control resource set (CORESET) pool is provided in the scheduling cell of any serving cell comprised by the scheduled cell set.

10. The second node according to claim 8, wherein a ratio of the number of serving cell(s) comprised by the first scheduled cell subset to a number of serving cell(s) comprised by the scheduled cell set being associated with at least one control channel candidate is used to determine a first parameter; the first threshold is equal to a maximum integer no greater than a first intermediate value, and the first intermediate value is proportional to the first parameter; the second threshold is equal to a maximum integer no greater than a second intermediate value, and the second intermediate value is proportional to the first parameter.

11. The second node according to claim 8, wherein a second parameter is used to determine the first threshold and the second threshold, the second parameter being a positive integer; the second parameter is equal to the number of serving cells comprised by the scheduled cell set; or, the second transceiver receives a third information block, wherein the third information block is used to indicate the second parameter.

12. The second node according to claim 8, wherein the second transceiver transmits a fourth information block, wherein the fourth information block is used to indicate M3 control resource sets, M3 being a positive integer greater than 1, and a control resource set to which any one of the M2 control channel elements belongs is one of the M3 control resource sets; the second information block is used to indicate a target combination set, the target combination set comprising a positive integer number of combination(s), a combination employed by the serving cell(s) comprised by the first scheduling cell subset belongs to the target combination set; the number of multicarrier symbols comprised by the first time window is equal to a larger value between a first symbol quantity and a second symbol quantity; the first symbol quantity is equal to a maximum value of numbers of multicarrier symbols respectively occupied by the M3 control resource sets in time domain, while the second symbol quantity is equal to a minimum value of positive integers comprised by the combination(s) in the target combination set.

13. The second node according to claim 8, wherein the first scheduling cell subset comprises Y1 serving cells, Y1 being a positive integer greater than 1, the combination employed by the serving cells comprised by the first scheduling cell subset is used to determine Y1 candidate time windows respectively in the Y1 serving cells, any of the Y1 candidate time windows belonging to the first time window.

14. A method in a first node for wireless communications, comprising:

receiving a first information block and transmitting a second information block, the first information block being used to determine a scheduled cell set, the scheduled cell set comprising more than one serving cell, the scheduled cell set comprises a first scheduled cell subset, the first scheduled cell subset comprising a positive integer number of serving cell(s), and any serving cell comprised by the first scheduled cell subset belonging to the scheduled cell set;

monitoring M1 control channel candidates in a first time window, the M1 control channel candidates occupying M2 control channel elements, M1 being a positive integer greater than 1, and M2 being a positive integer greater than 1, and the first time window comprising a positive integer number of time-domain consecutive multicarrier symbols;

wherein a first scheduling cell subset comprises scheduling cell(s) of serving cell(s) comprised by the first scheduled cell subset, and the M1 control channel candidates are monitored in serving cell(s) comprised by the first scheduling cell subset, the first scheduling cell subset comprising a positive integer number of serving cell(s); the second information block is used to indicate a combination employed by the serving cell(s) comprised by the first scheduling cell subset, and the combination employed by the serving cell(s) comprised by the first scheduling cell subset comprises two positive integers; a subcarrier spacing (SCS) of subcarriers occupied by one of the M2 control channel elements in frequency domain is equal to a first SCS, and the first SCS is used to determine a time length of a multicarrier symbol comprised by the first time window, and the combination employed by the serving cell(s) comprised by the first scheduling cell subset is used to determine a number of multicarrier symbols comprised by the first time window; M1 is no greater than a first threshold, M2 is no greater than a second threshold, and both the first threshold and the second threshold are positive integers; a number of serving cell(s) comprised by the first scheduled cell subset and a number of serving cells comprised by the scheduled cell set are jointly used to determine the first threshold and the second threshold.

15. The method according to claim 14, is characterized in employing a first-type monitoring capability in a scheduling cell of any serving cell comprised by the scheduled cell set, the first information block being used to indicate the first-type monitoring capability; no more than one control resource set (CORESET) pool is provided in the scheduling cell of any serving cell comprised by the scheduled cell set.

16. The method according to claim 14, wherein a ratio of the number of serving cell(s) comprised by the first scheduled cell subset to a number of serving cell(s) comprised by the scheduled cell set being associated with at least one control channel candidate is used to determine a first parameter; the first threshold is equal to a maximum integer no greater than a first intermediate value, and the first intermediate value is proportional to the first parameter; the second threshold is equal to a maximum integer no greater than a second intermediate value, and the second intermediate value is proportional to the first parameter.

17. The method according to claim 14, wherein a second parameter is used to determine the first threshold and the second threshold, the second parameter being a positive integer; the second parameter is equal to the number of serving cells comprised by the scheduled cell set; or, comprising:

transmitting a third information block, wherein the third information block is used to indicate the second parameter.

18. The method according to claim 14, wherein the first SCS is one of X candidate SCSs, X being a positive integer greater than 1; the X candidate SCSs respectively correspond to X first-type candidate parameters, and any of the X first-type candidate parameters is a positive integer, the X candidate SCSs respectively correspond to X second-type candidate parameters, and any of the X second-type candidate parameters is a positive integer; a third parameter is one of the X first-type candidate parameters, and the third parameter is used to determine the first threshold; a fourth parameter is one of the X second-type candidate parameters, and the fourth parameter is used to determine the second threshold; the first SCS is used to determine the third parameter out of the X first-type candidate parameters, and the first SCS is used to determine the fourth parameter out of the X second-type candidate parameters.

19. The method according to claim 14, comprising:

receiving a fourth information block;

wherein the fourth information block is used to determine M3 control resource sets, M3 being a positive integer greater than 1, and a control resource set to which any one of the M2 control channel elements belongs is one of the M3 control resource sets; the second information block is used to indicate a target combination set, the target combination set comprising a positive integer number of combination(s), a combination employed by the serving cell(s) comprised by the first scheduling cell subset belongs to the target combination set; the number of multicarrier symbols comprised by the first time window is equal to a larger value between a first symbol quantity and a second symbol quantity; the first symbol quantity is equal to a maximum value of numbers of multicarrier symbols respectively occupied by the M3 control resource sets in time domain, while the second symbol quantity is equal to a minimum value of positive integers comprised by the combination(s) in the target combination set.

20. The method according to claim 14, wherein the first scheduling cell subset comprises Y1 serving cells, Y1 being a positive integer greater than 1, the combination employed by the serving cells comprised by the first scheduling cell subset is used to determine Y1 candidate time windows respectively in the Y1 serving cells, any of the Y1 candidate time windows belonging to the first time window.

\* \* \* \* \*